(12) United States Patent
Katori et al.

(10) Patent No.: US 10,977,774 B2
(45) Date of Patent: Apr. 13, 2021

(54) INFORMATION PROCESSING APPARATUS, INFORMATION PROCESSING METHOD, AND PROGRAM FOR ESTIMATING PREDICTION ACCURACY

(71) Applicant: SONY CORPORATION, Tokyo (JP)

(72) Inventors: Tomohiro Katori, Tokyo (JP); Jun Kimura, Kanagawa (JP); Ryo Fukazawa, Kanagawa (JP); Kazuomi Kondo, Kanagawa (JP); Tsubasa Tsukahara, Tokyo (JP)

(73) Assignee: SONY CORPORATION, Tokyo (JP)

(*) Notice: Subject to any disclaimer, the term of this patent is extended or adjusted under 35 U.S.C. 154(b) by 188 days.

(21) Appl. No.: 15/752,312

(22) PCT Filed: Jun. 14, 2016

(86) PCT No.: PCT/JP2016/067709
§ 371 (c)(1),
(2) Date: Feb. 13, 2018

(87) PCT Pub. No.: WO2017/047178
PCT Pub. Date: Mar. 23, 2017

(65) Prior Publication Data
US 2018/0240220 A1 Aug. 23, 2018

(30) Foreign Application Priority Data
Sep. 16, 2015 (JP) .............................. JP2015-182380

(51) Int. Cl.
*G06T 5/00* (2006.01)
*G02B 27/01* (2006.01)
(Continued)

(52) U.S. Cl.
CPC .......... *G06T 5/003* (2013.01); *G02B 27/0172* (2013.01); *G06F 3/011* (2013.01);
(Continued)

(58) Field of Classification Search
None
See application file for complete search history.

(56) References Cited

U.S. PATENT DOCUMENTS

| 5,502,537 A | * | 3/1996 | Utagawa | .................. G02B 7/36 |
| | | | | 396/95 |
| 8,928,777 B2 | * | 1/2015 | Park | .......................... G06T 5/50 |
| | | | | 348/239 |

(Continued)

FOREIGN PATENT DOCUMENTS

| JP | 2011-221800 A | 11/2011 |
| JP | 2011-258159 A | 12/2011 |

(Continued)

OTHER PUBLICATIONS

Yue, Zhao, and Ma Ji. "Real-Time Blur Rendering of Moving Objects in an Augmented Reality Environment." 2014 Sixth International Conference on Intelligent Human-Machine Systems and Cybernetics. vol. 2. IEEE, 2014. (Year: 2014).*

(Continued)

*Primary Examiner* — Michelle M Entezari
(74) *Attorney, Agent, or Firm* — Paratus Law Group, PLLC

(57) ABSTRACT

There is provided an information processing apparatus, an information processing method, and a program capable of further reducing the unpleasant feeling caused by the disturbance of the display of the virtual object, the information processing apparatus including: a prediction accuracy estimation unit that estimates a degree of prediction accuracy related to prediction of a position or a posture of a real object; and an output control unit that outputs information for causing a display unit to display a virtual object corresponding to the real object on a basis of an estimation result of the prediction accuracy estimation unit.

20 Claims, 26 Drawing Sheets

(51) Int. Cl.

| | | |
|---|---|---|
| *G06T 7/20* | (2017.01) | |
| *G06T 11/00* | (2006.01) | |
| *G06T 19/00* | (2011.01) | |
| *G06T 7/70* | (2017.01) | |
| *G06T 5/50* | (2006.01) | |
| *G09G 3/20* | (2006.01) | |
| *G09G 5/00* | (2006.01) | |
| *G06K 9/00* | (2006.01) | |
| *G06K 9/62* | (2006.01) | |
| *G06K 9/18* | (2006.01) | |
| *G06F 3/01* | (2006.01) | |
| *G06F 3/0481* | (2013.01) | |

(52) U.S. Cl.
CPC ..... *G06F 3/04815* (2013.01); *G06K 9/00201* (2013.01); *G06K 9/00597* (2013.01); *G06K 9/00671* (2013.01); *G06K 9/6201* (2013.01); *G06T 5/50* (2013.01); *G06T 7/20* (2013.01); *G06T 7/70* (2017.01); *G06T 11/00* (2013.01); *G06T 19/006* (2013.01); *G09G 3/20* (2013.01); *G09G 5/00* (2013.01); *G02B 2027/014* (2013.01); *G02B 2027/0138* (2013.01); *G06K 9/183* (2013.01); *G06T 2207/20201* (2013.01); *G06T 2207/30244* (2013.01)

(56) References Cited

U.S. PATENT DOCUMENTS

| | | | | |
|---|---|---|---|---|
| 9,348,141 | B2 * | 5/2016 | Bar-Zeev | G06F 3/013 |
| 9,618,749 | B2 * | 4/2017 | Deleeuw | G16H 40/63 |
| 10,425,593 | B2 * | 9/2019 | O'Neill | H04N 5/23293 |
| 10,482,583 | B1 * | 11/2019 | Suszek | G06T 3/40 |
| 10,523,879 | B2 * | 12/2019 | Dye | H04N 5/23293 |
| 10,565,925 | B2 * | 2/2020 | Perdices-Gonzalez | G09G 3/2092 |
| 2010/0026714 | A1 * | 2/2010 | Utagawa | G02B 27/017 345/633 |
| 2011/0306422 | A1 * | 12/2011 | Nishimoto | G06F 3/017 463/36 |
| 2014/0176591 | A1 * | 6/2014 | Klein | G09G 3/003 345/589 |
| 2015/0178967 | A1 * | 6/2015 | Kruglick | G06T 11/60 345/625 |
| 2017/0193679 | A1 * | 7/2017 | Wu | G06F 3/048 |

FOREIGN PATENT DOCUMENTS

| | | |
|---|---|---|
| JP | 2012-221250 A | 11/2012 |
| KR | 101919077 B1 * | 11/2018 |

OTHER PUBLICATIONS

Fischer, Jan, Dirk Bartz, and Wolfgang Straßer. "Enhanced visual realism by incorporating camera image effects." 2006 IEEE/ACM International Symposium on Mixed and Augmented Reality. IEEE, 2006. (Year: 2006).*

KR 10-1919077 B1 Machine Translation (Year: 2018).*

Okumura, Bunyo, Masayuki Kanbara, and Naokazu Yokoya. "Augmented reality based on estimation of defocusing and motion blurring from captured images." 2006 IEEE/ACM International Symposium on Mixed and Augmented Reality. IEEE, 2006. (Year: 2006).*

* cited by examiner

FIG. 7
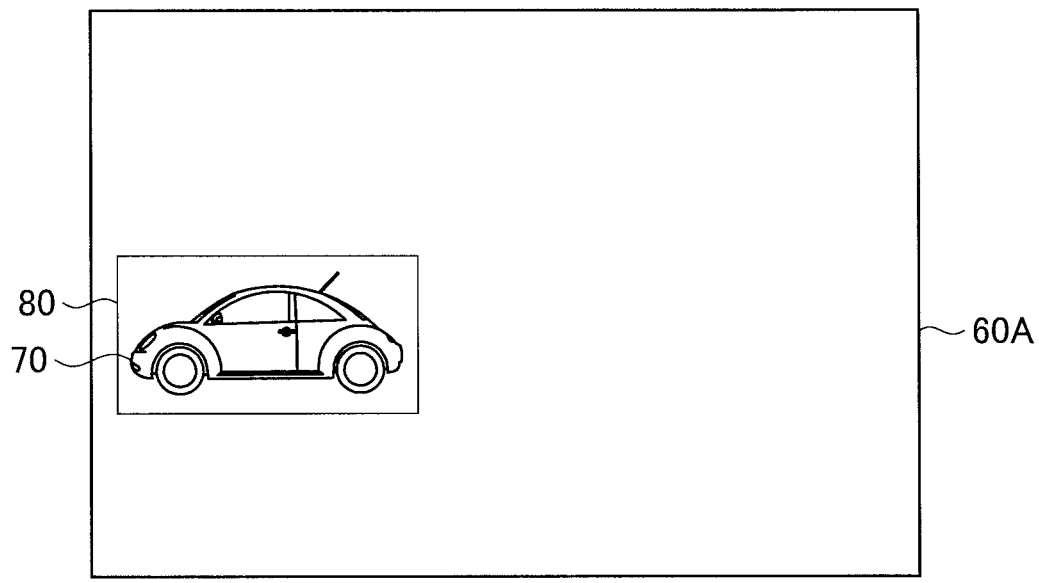
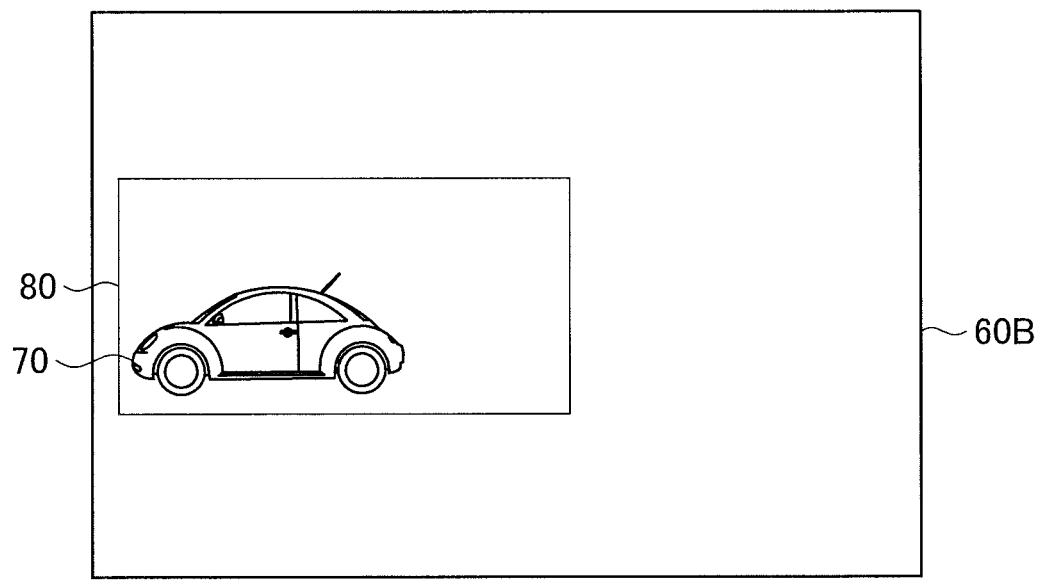

FIG. 8
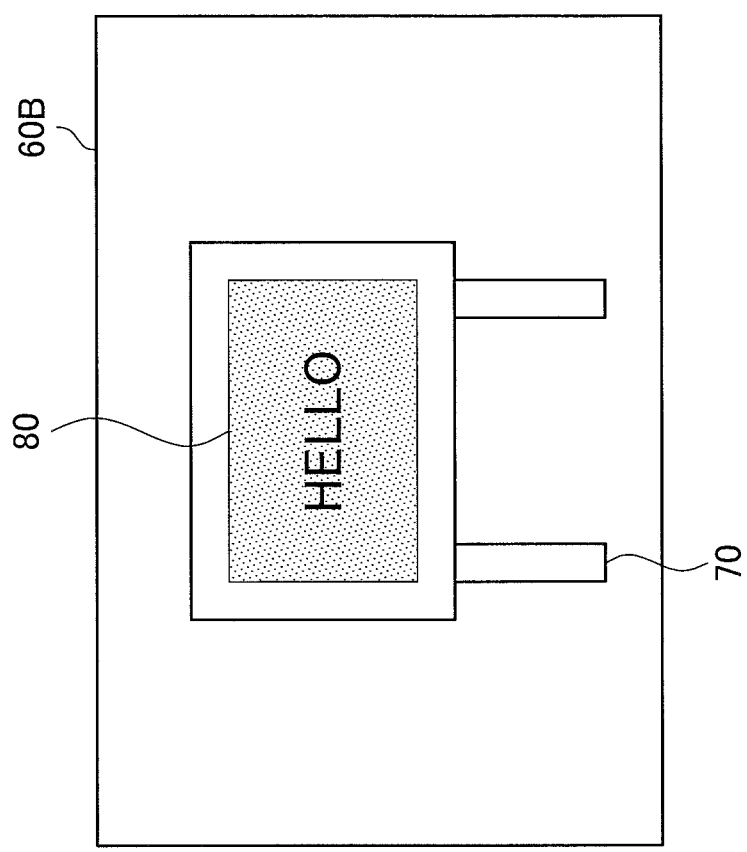
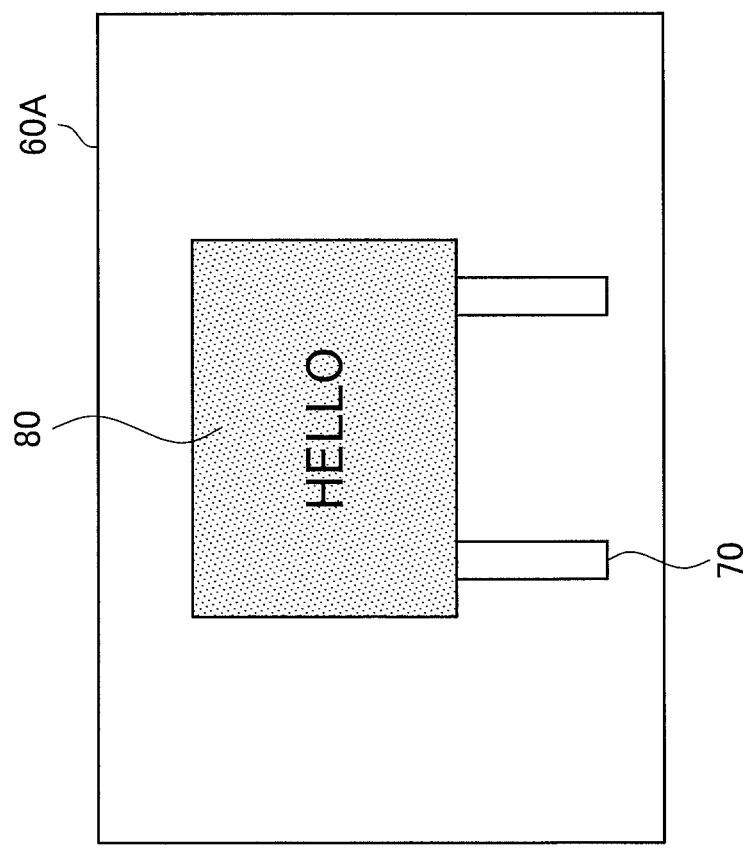

INFORMATION PROCESSING APPARATUS, INFORMATION PROCESSING METHOD, AND PROGRAM FOR ESTIMATING PREDICTION ACCURACY

CROSS REFERENCE TO PRIOR APPLICATION

This application is a National Stage Patent Application of PCT International Patent Application No. PCT/JP2016/067709 (filed on Jun. 14, 2016) under 35 U.S.C. § 371, which claims priority to Japanese Patent Application No. 2015-182380 (filed on Sep. 16, 2015), which are all hereby incorporated by reference in their entirety.

TECHNICAL FIELD

The present disclosure relates to an information processing apparatus, an information processing method, and a program.

BACKGROUND ART

In recent years, technology called augmented reality (AR) that presents a user with additional information superimposed on the real world has attracted public attention. In the AR technology, information presented to the user is also called annotation and can be visualized using various forms of virtual objects such as text, icons, or animation.

Virtual objects of the AR are typically displayed in connection with real objects, and for example, the virtual objects are displayed on surfaces of the real objects or are displayed as if the virtual objects were floating above the real objects. Therefore, it is desirable that the display of the virtual object appropriately be made to follow changes in positions or postures of the real objects. As one of technologies that satisfy such a requirement, Patent Literature 1 discloses a technology of recognizing the position or the posture of a real object and allowing a change in display in accordance with stability of recognition when a virtual object is displayed on the basis of a recognition result.

CITATION LIST

Patent Literature

Patent Literature 1: JP 2012-221250A

DISCLOSURE OF INVENTION

Technical Problem

However, disturbance of the display of the virtual object still occurs in some cases according to the technology disclosed in Patent Literature 1. Even in a case in which recognition is stable, for example, the display of the virtual object is disturbed without any appropriate display control, which gives a user an unpleasant feeling in some cases. Thus, the present disclosure proposes a novel and improved information processing apparatus, information processing method, and program capable of further reducing the unpleasant feeling caused by the disturbance of the display of the virtual object.

Solution to Problem

According to the present disclosure, there is provided an information processing apparatus including: a prediction accuracy estimation unit that estimates a degree of prediction accuracy related to prediction of a position or a posture of a real object; and an output control unit that outputs information for causing a display unit to display a virtual object corresponding to the real object on a basis of an estimation result of the prediction accuracy estimation unit.

In addition, according to the present disclosure, there is provided an information processing method including: estimating, by a processor, a degree of prediction accuracy related to prediction of a position or a posture of a real object; and outputting information for causing a display unit to display a virtual object corresponding to the real object on a basis of an estimation result of the degree of prediction accuracy.

In addition, according to the present disclosure, there is provided a program that causes a computer to function as: a prediction accuracy estimation unit that estimates a degree of prediction accuracy related to prediction of a position or a posture of a real object; and an output control unit that outputs information for causing a display unit to display a virtual object corresponding to the real object on a basis of an estimation result of the prediction accuracy estimation unit.

Advantageous Effects of Invention

According to the present disclosure, it is possible to further reduce an unpleasant feeling caused by disturbance of display of a virtual object as described above. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 7 is an explanatory diagram for explaining a UI example according to the embodiment.

FIG. 8 is an explanatory diagram for explaining a UI example according to the embodiment.

MODE(S) FOR CARRYING OUT THE INVENTION

Figure 1:
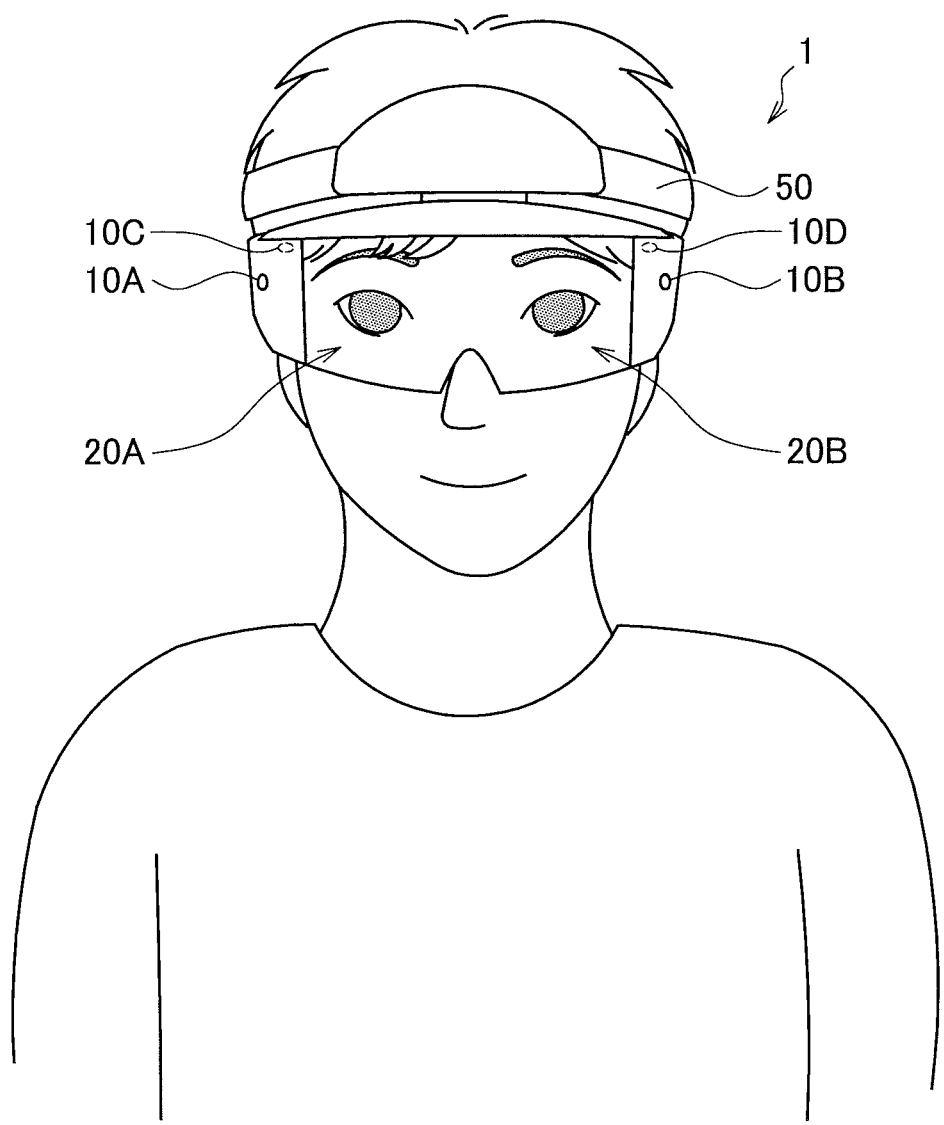
FIG. 1 is a diagram illustrating an example of an external configuration of an information processing apparatus according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Now, description will be given in the following order.

1. Introduction
1.1 External configuration example
1.2 Technical problems
2. First Embodiment
2.1 Configuration example
2.2 Flow of processing
2.3 UI example
3. Application examples to see-through type HMD
3.1 Configuration example 1
3.2 Configuration example 2
3.3 Configuration example 3
4. Modification example
5. Hardware configuration example
6. Conclusion

1. INTRODUCTION

1.1. External Configuration Example

First, an example of an external configuration of an information processing apparatus according to one embodiment of the present disclosure will be described with reference to FIG. 1.

FIG. 1 is a diagram illustrating an example of an external configuration of an information processing apparatus 1 according to the present embodiment. The information processing apparatus 1 illustrated in FIG. 1 is a device also called smart glasses or a head mounted display (HMD). The information processing apparatus 1 includes a mounting unit 50 of a frame structure that surrounds, for example, the head of the user and is fixed to the head of the user through the mounting unit 50. The information processing apparatus 1 has a configuration in which a pair of display units 20A and 20B for the left eye and the right eye are arranged in front of the eyes of the user in the mounted state illustrated in FIG. 1. For example, a transmissive type display is used as the display unit 20, and the information processing apparatus 1 is able to enter a through state, that is, a transparent or semi-transparent state, by controlling transmittance of the transmissive type display. When the display unit 20 is in the through state, there is no difficulty in normal life even if the user constantly wears the information processing apparatus 1 as with glasses.

The display unit 20 is able to display a virtual object of the AR superimposed on the landscape of a real space by displaying images such as text or drawings in the transparent or semi-transparent state. In other words, the information processing apparatus 1 may be implemented as a transmissive type HMD. Note that, in the transmissive type HMD, preferably, the information processing apparatus 1 is fixed to the head of the user through the mounting unit 50, and a relative positional relation between the two eyes of the user and the display unit 20 is fixed as illustrated in FIG. 1. This is because if the relative positional relation changes, a position on the display for displaying the virtual object may change.

Further, the display unit 20 is also able to display the virtual object superimposed on captured images of the real space captured by imaging units 10A and 10B while displaying the captured images of the real space. The display unit 20 is also able to display the virtual object superimposed on the image of the virtual space while displaying images similar to images obtained by imaging the virtual space through the imaging units 10A and 10B. In other words, the information processing apparatus 1 may be implemented as an immersive (video through type) HMD.

Alternatively, the display unit 20 may be implemented as an LED light source or the like that projects an image directly onto the retina of the user. In other words, the information processing apparatus 1 may be implemented as a projection type HMD.

Various types of content may be displayed on the display unit 20 as the virtual object. For example, content may be data such as moving image content including a movie or a video clip, still image content imaged by a digital still camera or the like, an electronic book, or the like. Further, such content may all be data to be displayed such as computer use data such as image data, text data, or spreadsheet data which is generated by the user using a personal computer or the like, a game image based on a game program, or the like The imaging units 10A and 10B are arranged to perform imaging using a real space in a direction in which the user views as an imaging range in a state in which the user wears the information processing apparatus 1. Each of the imaging units 10A and 10B may be implemented as a stereo camera capable of acquiring information indicating a distance in a direction in which the user views (hereinafter also referred to as "depth information"). In a case in which each of the imaging units 10A and 10B is implemented as a stereo camera, the information processing apparatus 1 is able to recognize a shape and a posture of the real object in the real space with a high degree of accuracy. Hereinafter, each of the imaging units 10A and 10B is also referred to as an "outward facing stereo camera 10."

On the other hand, imaging units 10C and 10D are arranged to perform imaging using the direction of the user, more specifically, both eyes of the user, as the imaging range in the state in which the user wears the information processing apparatus 1. Each of the imaging units 10C and 10D may be implemented as a stereo camera capable of acquiring the depth information in the direction of both eyes of the user. In a case in which each of the imaging units 10C and 10D is implemented as a stereo camera, the information processing apparatus 1 is able to recognize an eyeball position, a pupil position, a line-of-sight direction, or the like of the user with a high degree of accuracy. Hereinafter, each of the imaging units 10C and 10D is also referred to as an "inward facing stereo camera 10."

Further, although not illustrated in FIG. 1, the information processing apparatus 1 may have a speaker or an earphone speaker. Further, the information processing apparatus 1 may include a microphone for acquiring an external sound.

The external appearance of the information processing apparatus 1 illustrated in FIG. 1 is an example, and various structures in which the user wears the information processing apparatus 1 can be considered. The information processing apparatus 1 may include a mounting unit which is generally considered to be of an eyeglass type or head mounted type, and at least in this embodiment, it is sufficient that the display unit 20 is arranged close to the eyes of the user. Further, the display unit 20 may be configured such that a pair of units corresponding to both eyes are disposed or a single unit corresponding to one eye may be disposed.

Similarly, two speakers or two earphone speakers corresponding to the left and right ears may be disposed, or one speaker or one earphone speaker corresponding to one ear may be disposed. Further, one or more microphones may be disposed, and this arrangement is arbitrary.

The example of an external configuration of the information processing apparatus 1 according to an embodiment of the present disclosure has been described above.

Note that, in the following description, as an example, the information processing apparatus 1 is assumed to be implemented as a transmissive type HMD. Hereinafter, an image displayed on the display unit 20 (transmission type display) of the information processing apparatus 1 (including a transparently visible background and a superimposedly displayed virtual object) is also referred to as a "real space image."

1.2 Technical Problems

Subsequently, technical problems will be described with reference to FIGS. 2 to 4.

Figure 2:
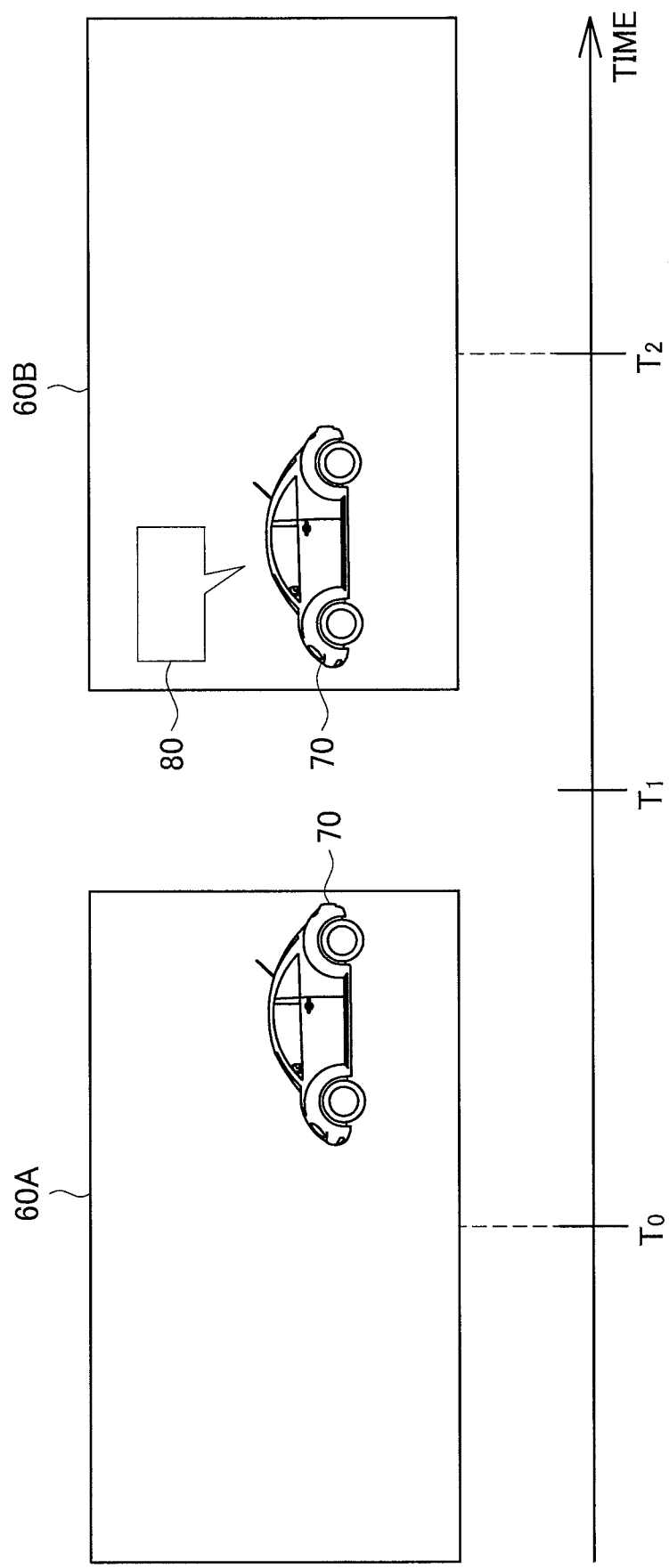
FIG. 2 is an explanatory diagram for explaining a technical problem.
Figure 3:
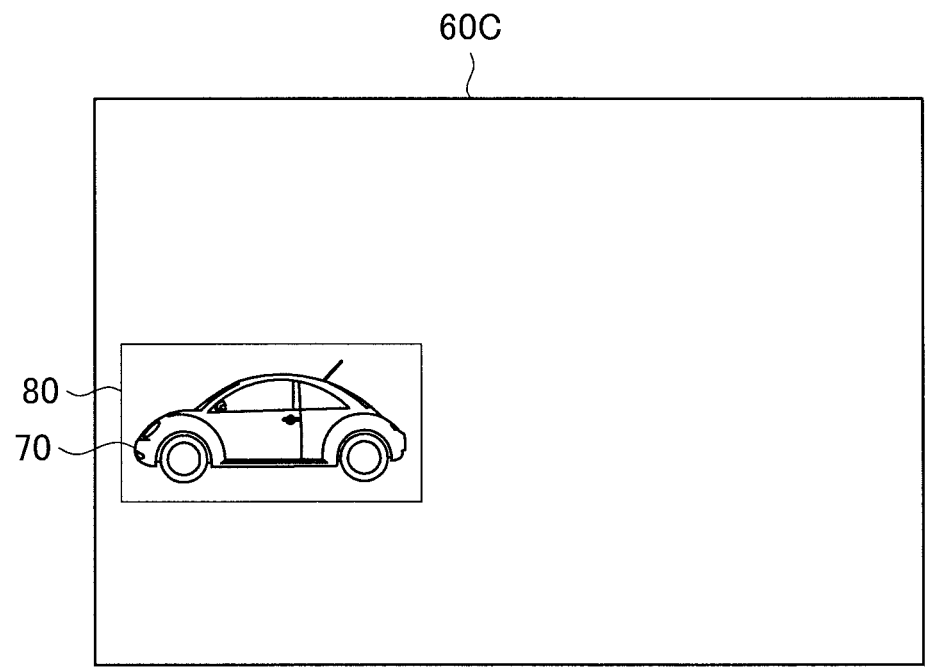
FIG. 3 is an explanatory diagram for explaining a technical problem.
Figure 4:
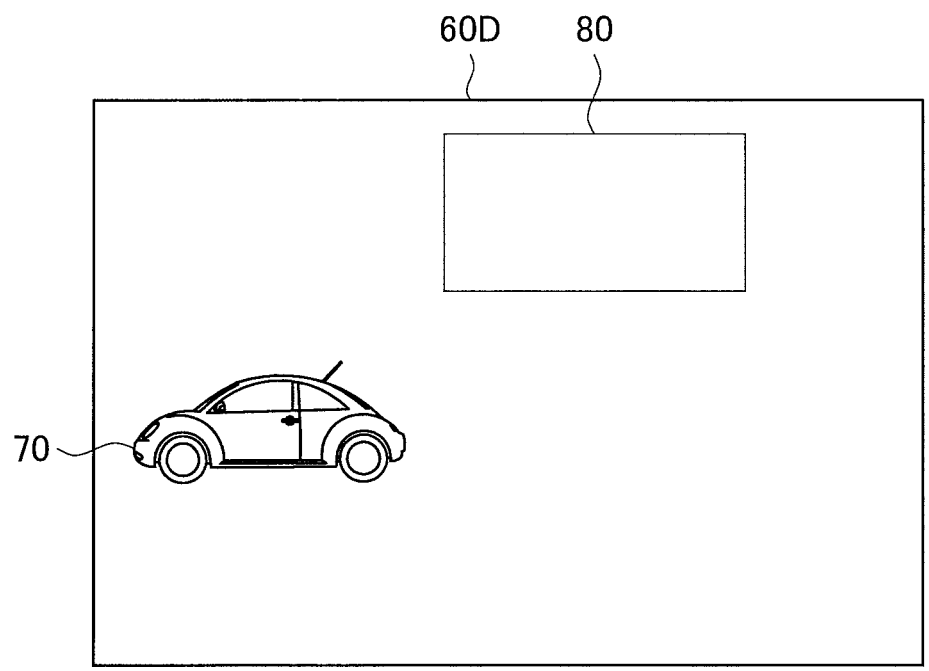
FIG. 4 is an explanatory diagram for explaining a technical problem.

FIGS. 2 to 4 are explanatory diagrams for explaining technical problems. FIG. 2 shows an example of a change in a position or a posture of a real object that is included in a real space image. In the drawing, time flows from the left side to the right side.

The information processing apparatus 1 is assumed to display a virtual object at a position or a posture corresponding to a predicted position or posture while predicting a change in the position or the posture of a real object 70. To do this, the information processing apparatus 1 detects (senses) information regarding the real object 70 that is included in a real space image 60A at a time $T_0$ first. For example, the information processing apparatus 1 images a condition of the real space with a camera from a viewpoint of the user and reads the condition as digital data. Then, at a time $T_1$, the information processing apparatus 1 predicts a change in the position or the posture of the real object 70 at a time $T_2$ on the basis of the information detected at the time $T_0$. For example, the information processing apparatus 1 recognizes the real object 70 on the basis of the captured image and predicts a change in the position or the posture of the recognized real object 70. Then, the information processing apparatus 1 displays a virtual object 80 in a real space image 60B on the basis of a prediction result at the time $T_2$.

What should be noted here is that there is a time (that is, a time lag) from the time $T_0$ at which the information for prediction is detected to the time $T_2$ at which the virtual object 80 is displayed. In a case in which the real object 70 is not predicted with a high degree of accuracy in the time lag, display disturbance in which the virtual object 80 is displayed at a position or a posture deviated from a position or a posture at which the virtual object 80 should originally be displayed occurs, which can confuse the user or can give the user an unpleasant feeling. Hereinafter, this point will be described with reference to FIGS. 3 and 4.

FIG. 3 shows an example of a real space image 60C that is displayed at the time $T_2$ in a case in which prediction has been performed with a high degree of accuracy. As shown in the real space image 60C, the virtual object 80 is precisely superimposed at the position of the real object 70. Therefore, the user is neither confused nor given an unpleasant feeling.

FIG. 4 shows an example of a real space image 60D that is displayed at the time $T_2$ in a case in which prediction has not been performed with a high degree of accuracy. As shown in the real space image 60D, the virtual object 80 is displayed at a position separate from the position of the real object 70. Such deviation of the display confuses the user or gives the user an unpleasant feeling.

Similar technical problems can similarly occur in a video through type HMD, for example, that has a non-transmissive type display as well as the device that has the transmissive type display. For example, the aforementioned disturbance of display can similarly occur in a configuration in which a virtual object is displayed at a predicted position or posture in parallel with real-time display of conditions of a real space on a display.

With regard to such problems, it is considered to be difficult to sufficiently suppress the disturbance of the display by the technology described in Patent Literature 1. Even in a case in which recognition is stable, for example, the display of the virtual object may be disturbed in a case of a low degree of prediction accuracy. In a case in which a real object moves irregularly, for example, the disturbance of display can significantly occur. Also, according to Patent Literature 1, the virtual object is superimposedly displayed at the time $T_2$ on the image of the real space which has been imaged at the time $T_0$. In other words, since the technology described in Patent Literature 1 does not take movement of the real object and a change in the posture thereof during the time lag between the time $T_0$ and the time $T_2$ into consideration, it is not possible to solve the technical problems described above.

Thus, the information processing apparatus 1 according to one embodiment of the present disclosure was contrived in consideration of the aforementioned circumstances as one point of focus. The information processing apparatus 1 according to the embodiment is able to suppress disturbance of display of a virtual object by performing display control based on a degree of prediction accuracy related to the aforementioned time lag, and even in a case in which the display is disturbed, it is possible to reduce confusion or an unpleasant feeling given to the user.

In addition, the time $T_0$ will also be referred to as a detection time, and the time $T_2$ will also be referred to as a display time hereinafter.

2. FIRST EMBODIMENT

First, an example of a configuration of an information processing apparatus according to a first embodiment will be described with reference to FIG. 5.

2.1 Configuration Example

Figure 5:
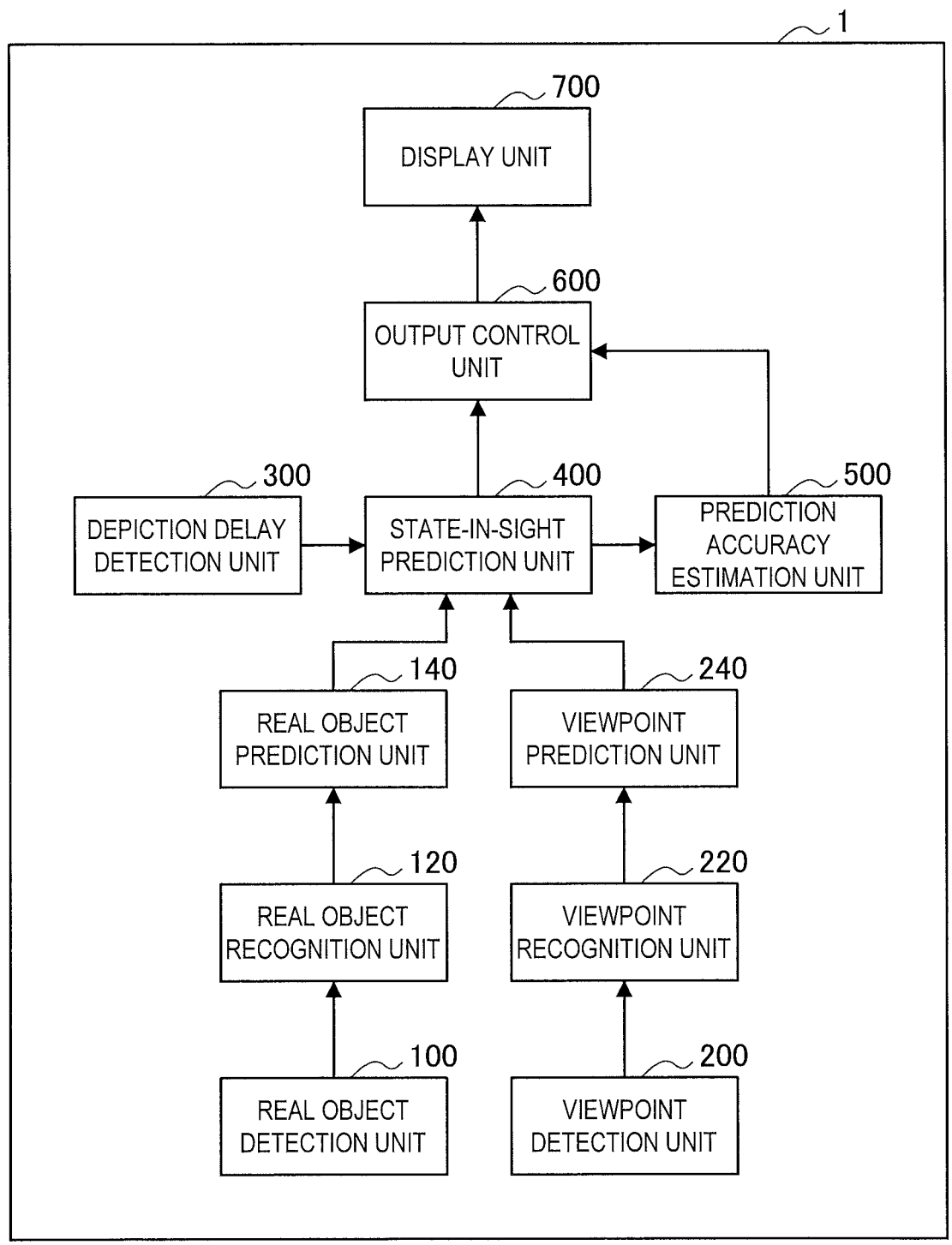
FIG. 5 is a block diagram illustrating an example of a logical configuration of the information processing apparatus according to a first embodiment.

FIG. 5 is a block diagram illustrating an example of a logical configuration of the information processing apparatus according to the embodiment. As illustrated in FIG. 5, the information processing apparatus 1 according to the embodiment includes a real object detection unit 100, a real object recognition unit 120, a real object prediction unit 140, a viewpoint detection unit 200, a viewpoint recognition unit 220, a viewpoint prediction unit 240, a depiction delay detection unit 300, a state-in-sight prediction unit 400, a prediction accuracy estimation unit 500, an output control unit 600, and a display unit 700.

(Real Object Detection Unit 100)

The real object detection unit 100 has a function of detecting information regarding the real object at the detection time $T_0$. For example, the real object detection unit 100 acquires information that has been detected by a sensor that senses the real object as a sensing target. As such a sensor, a camera, a depth sensor, an infrared ray sensor, a radio wave sensor, and the like, for example, are exemplified. In addition, the real object detection unit 100 can be realized as an outward facing stereo camera 10 in the example illustrated in FIG. 1.

(Real Object Recognition Unit 120)

The real object recognition unit 120 has a function of recognizing the real object on the basis of the information that has been acquired by the real object detection unit 100. The real object recognition unit 120 recognizes the position or the posture of the real object. It is assumed that the position or the posture of the real object means the position or the posture of the real object in a world coordinate system. The world coordinate system is a coordinate system that represents absolute coordinates fixedly defined in the real space.

Various methods can be employed for the recognition of the real object.

For example, the recognition of the real object may be performed by matching a feature amount that is calculated from a captured image with a feature amount of the real object that is registered in advance. The feature amount can be calculated by a publicly known feature amount calculation technology such as a SIFT method or a random ferns method, for example.

Also, the recognition of the real object may be performed by recognizing a known figure or a symbol that is attached to the real object, an artificial marker (for example, a barcode or a QR code (registered trademark)), a natural marker, or the like.

Alternatively, the recognition of the real object may be performed on the basis of depth information per pixel and a degree of reliability of the depth information based on an image obtained by a stereo camera. For example, the real object recognition unit 120 recognizes the position and the shape (in other words, irregularity of the real space viewed from the imaging unit) of the real object on the basis of differences in a real substance in a plurality of captured images that image the same real space as an imaged target from different viewpoints (binocular parallax). Note that, due to a characteristic of stereo image recognition, the degree of reliability of the depth information related to a region in which a change in a color tone or the like is small may be low. The depth information may be acquired using an arbitrary technique such as a depth sensor of a time of flight (ToF) scheme.

(Real Object Prediction Unit 140)

The real object prediction unit 140 has a function of performing prediction regarding the real object at the display time $T_2$ on the basis of the recognition result of the real object recognition unit 120. For example, the real object prediction unit 140 has a function of predicting the position or the posture of the real object at the display time $T_2$. To do this, the real object prediction unit 140 accumulates logs of the position or the posture of the recognized real object and performs the prediction on the basis of the accumulated logs. Hereinafter, an example of the prediction method will be described.

For example, the real object prediction unit 140 predicts the position at which a real object that is located at coordinates $(x_{t0}, y_{t0}, z_{t0})$ at a time t0 is present at a time t by the following equation.

$$(x_t, y_t, z_t) = (x_{t0} + V_{xt0}(t-t0), y_{t0} + V_{yt0}(t-t0), z_{t0} + V_{zt0}(t-t0)) \quad (1)$$

The above Equation (1) is used in a case in which the real object moves at a velocity $v_{t0} = (v_{xt0}, v_{yt0}, v_{zt0})$ at the time t0 and prediction is performed on the assumption that the real object moves linearly at the constant velocity until the time t.

(Viewpoint Detection Unit 200)

The viewpoint detection unit 200 has a function of detecting information regarding a viewpoint at the detection time $T_0$. The viewpoint may mean the position or the posture (in other words, a direction of the line of sight) of the eyes of the user, or may mean the position or the posture of the display unit 700, or may include both. For example, the viewpoint detection unit 200 acquires information that has been detected by a sensor that senses the user or the information processing apparatus 1 itself as a sensing target. As such a sensor, a camera, a depth sensor, a gyro sensor, an acceleration sensor, a global navigation satellite system (GNSS), and the like, for example, are exemplified. In addition, the viewpoint detection unit 200 can be realized as an inward facing stereo camera 10 and an outward facing stereo camera 10 in the example illustrated in FIG. 1. For example, an image captured by the inward facing stereo camera 10 can be used for recognizing in which direction the eyes are looking with respect to a relative coordinate system on the face. In addition, an image captured by the outward facing stereo camera 10 can be used for recognizing movement of a feature point in the external world and for recognizing movement of the viewpoint (in other words, the head) in the world coordinate system (that is, for the SLAM method, which will be described later). The recognition is performed by the viewpoint recognition unit 220, which will be described later.

(Viewpoint Recognition Unit 220)

The viewpoint recognition unit 220 has a function of recognizing the position or the posture of the viewpoint on the basis of the information that has been acquired by the viewpoint detection unit 200. The position or the posture of the viewpoint is assumed to mean the position or the posture of the viewpoint in the world coordinate system.

Various methods can be employed for recognizing the viewpoint.

For example, the recognition of the viewpoint may be performed by a publicly known image recognition technology such as a structure from motion (SfM) method or a simultaneous localization and mapping (SLAM) method. In such a case, the recognition of the viewpoint is performed by recognizing a relative position and a posture of a coordinate system of a reference environment (real space) with respect to an apparatus-specific coordinate system of the information processing apparatus 1, for example. For example, in a case in which the SLAM method is used, a state variable including a position, a posture, a velocity, and an angular velocity of a device and a position of at least one feature point included in a captured image is updated for each frame of a captured image on the basis of a principle of an extended Kalman filter. Accordingly, it is possible to recognize the position and posture of the reference environment based on the position and posture of the device using an input image input from a monocular camera. Note that, for detailed description of the SLAM technique, see, for example, "Real-Time Simultaneous Localization and Mapping with a Single Camera" (Andrew J. Davison, Proceedings of the 9th IEEE International Conference on Computer Vision Volume 2, 2003, pp. 1403-1410).

Alternatively, the recognition of the viewpoint may be performed by any method as long as the relative position and the posture of the imaging unit in the real space are recognized. For example, the environment recognition matrix may be recognized on the basis of depth data obtained from a depth sensor that may be installed in the imaging unit. The environment recognition matrix may also be recognized on the basis of output data output from an environment recognition system such as an infrared ranging system or a motion capture system. An example of such a technique is described in, for example, S. Izadi, et al, KinectFusion: Real-time 3D Reconstruction and Interaction Using a Moving Depth Camera, ACM Symposium on User Interface Software and Technology, 2011, but the technique is not limited thereto, and various publicly known techniques may be used.

Alternatively, the recognition of the viewpoint may be performed by specifying a relative positional relation of the respective frame images by stitching analysis of a series of frame images that capture the real space. In this case, the stitching analysis may be two-dimensional stitching analysis of attaching frame images onto a base plane or three-dimensional stitching analysis of attaching frame images onto arbitrary positions in a space.

Furthermore, the recognition of the viewpoint may be performed by using an inertial sensor such as an acceleration sensor or a gyro sensor that is included in the information processing apparatus 1 together. In such a case, the viewpoint can be recognized at a higher velocity. Also, it is possible to perform the recognition with some degree of accuracy even in a case in which it is difficult to recognize the viewpoint on the basis of the captured images due to motion blur or the like caused by movement of the user (camera position) at a high velocity.

(Viewpoint Prediction Unit 240)

The viewpoint prediction unit 240 has a function of performing prediction regarding the viewpoint at the display time $T_2$ on the basis of the recognition result of the viewpoint recognition unit 220. For example, the viewpoint prediction unit 240 predicts the position or the posture of the viewpoint at the display time $T_2$. To do this, the viewpoint prediction unit 240 accumulates logs of the position or the posture of the recognized viewpoint and performs the prediction on the basis of the accumulated logs. As a specific prediction method, a prediction method similar to that described above in relation to the real object prediction unit 140 can be employed.

(Depiction Delay Detection Unit 300)

The depiction delay detection unit 300 has a function of detecting a time lag between the detection time $T_0$ and the display time $T_2$. The time lag may be a predetermined value or dynamically change. The length of the time lag can vary depending on a processing time of various kinds of processing performed from the detection time $T_0$ to the display time $T_2$. For example, the time lag can become short when a processing load is low while the time lag can become long when the processing load is high. In addition, the length of the time lag can also vary depending on operation frequency setting, ON/OFF of power saving setting, and the like of a CPU. GPU, sensors, and the like that execute the various kinds of processing. For example, the depiction delay detection unit 300 can detect the time lag on the basis of the processing loads of the various kinds of processing, the operation frequency setting, ON/OFF of the power saving setting, and the like.

(State-in-Sight Prediction Unit 400)

The state-in-sight prediction unit 400 has a function of predicting the position or the posture of the real object that appears in a field of vision of the user (in other words, in the real space image) at the display time $T_2$. The prediction is prediction regarding the time lag from the timing $T_0$ at which the information for prediction is detected to the timing $T_2$ at which the virtual object is displayed. The state-in-sight prediction unit 400 performs the prediction on the basis of prediction results of the real object prediction unit 140 and the viewpoint prediction unit 240 about how the real object moves and how the viewpoint moves during the time lag. In addition, the position or the posture of the real object that appears in the field of vision of the user is assumed to mean the position or the posture of the real object on a display plane of the display unit 700 viewed by the eyes of the user.

(Prediction Accuracy Estimation Unit 500)

The prediction accuracy estimation unit 500 has a function of estimating a degree of prediction accuracy regarding the prediction of the position or the posture of the real object that appears on the display unit 700 (transmitted through a transmissive type display or displayed on a non-transmissive type display, for example). Specifically, the prediction accuracy estimation unit 500 estimates a degree of accuracy of the prediction by the state-in-sight prediction unit 400. In addition, the prediction accuracy estimation unit 500 may estimate a factor of a low degree of prediction accuracy in a case in which the degree of prediction accuracy is low.

Various methods of estimating the degree of prediction accuracy can be considered.

For example, the prediction accuracy estimation unit 500 may estimate the degree of prediction accuracy on the basis of the time lag between the detection time $T_0$ and the display time $T_2$. For example, the prediction accuracy estimation unit 500 estimates that the degree of prediction accuracy is lower as the time lag is longer and estimates that the degree of prediction accuracy is higher as the time lag is shorter. This is because the possibility of occurrence of an error increases as the time lag is longer. Alternatively, the prediction accuracy estimation unit 500 may determine that the degree of prediction accuracy is low in a case in which the time lag is equal to or greater than a threshold value and determine that the degree of prediction accuracy is high in a case in which the time lag is less than the threshold value.

For example, the prediction accuracy estimation unit 500 may estimate the degree of prediction accuracy on the basis of at least one of the magnitude or regularity of motion of the target that is used for predicting the position or the posture of the real object or the viewpoint. Specifically, the prediction accuracy estimation unit 500 estimates that the degree of prediction accuracy is lower as the motion of the target is larger and estimates that the degree of prediction accuracy is higher as the motion of the target is smaller. Similarly, the prediction accuracy estimation unit 500 estimates that the degree of prediction accuracy is lower as the regularity of the motion of the target is lower and estimates that the degree of prediction accuracy is higher as the regularity of the motion of the target is higher. A threshold may be used in a manner similar to that in the case of the time lag. In addition, the target described herein indicates the real object, the display unit 700, the eyes of the user, and the like, for example. In other words, the prediction accuracy estimation unit 500 may estimate the degree of prediction accuracy on the basis of the magnitude or the regularity of the motion of the real object. Alternatively, the prediction accuracy estimation unit 500 may estimate the degree of prediction accuracy on the basis of the magnitude or the regularity of the motion of the display unit 700. Alternatively, the prediction accuracy estimation unit 500 may estimate the degree of prediction accuracy on the basis of the magnitude or the regularity of the motion of the eyes of the user.

(Output Control Unit 600)

The output control unit 600 controls processing of display (processing of depicting) the virtual object by the display unit 700. Specifically, the output control unit 600 allows the display of the virtual object at the position corresponding to the position of the real object, which has been predicted by the state-in-sight prediction unit 400, or at the posture corresponding to the posture of the real object, which has been predicted by the state-in-sight prediction unit 400. In this manner, it is possible to superimposedly display the virtual object on the surface of the real object or to display the virtual object in an associated manner above the real object, for example.

Here, the display position of the virtual object may mean the position in the real space that the user perceives (in other words, the position in the world coordinate system) or may mean the position (in other words, coordinates on the screen) on the display unit 700 (a transmissive type display, for example). However, the display of the virtual object may be different depending on what it means. For example, even when there is a sense of perspective as the position perceived by the user, it may be displayed at the same position on the display unit 700.

The output control unit 600 controls the display of the virtual object corresponding to the real object on the basis of the estimation result of the prediction accuracy estimation unit 500. This is because disturbance of the display is less likely to occur as the degree of prediction accuracy is higher while the disturbance of the display more easily occurs as the degree of prediction accuracy is lower. The output control unit 600 is able to further suppress the disturbance of the display of the virtual object by performing the display in consideration of the degree of prediction accuracy.

For example, the output control unit 600 may allow the display of the virtual object such that relevance with the corresponding real object is higher as the degree of prediction accuracy is higher and may allow the display of the virtual object such that relevance with the corresponding real object is lower as the degree of prediction accuracy is lower. This is because disturbance of the display, such as display of the virtual object at a position separate from the real object, for example, can more easily occur as the degree of prediction accuracy is lower. In such a case, the user can roughly grasp the relevance even in a case in which the virtual object is displayed at a position separate from the real object by displaying the virtual object with low relevance (in a rough manner, for example). In this manner, even in a case in which the display of the virtual object is disturbed, it is possible to reduce an influence thereof by displaying the virtual object with low relevance. In a case in which the degree of prediction accuracy is higher, the user is allowed to clearly grasp the relevance by displaying the virtual object with high relevance. Specific UI examples related to such display control will be described later in detail with reference to FIGS. 7 to 11. For example, in relation to FIG. 7, the display with high relevance indicates that the virtual object is displayed to be small while the display with low relevance indicates that the virtual object is displayed to be large. As the virtual object is displayed to be smaller, the real object is situated within the virtual object with a smaller gap, and higher relevance is expressed. On the other hand, as the virtual object is displayed to be larger, the real object is situated within the virtual object with a larger gap, and lower relevance is expressed. In another example, in relation to FIG. 11, the display with high relevance indicates display to which motion blur processing is not applied while the display with low relevance indicates display to which the motion blur processing is applied. In a case in which the motion blur processing is not applied to the virtual object, the display position of the virtual object becomes clear, and the relevance with the real object is clearly (in other words, highly) expressed. In a case in which the motion blur processing is applied to the virtual object, the display position of the virtual object becomes ambiguous, and the relevance with the real object is ambiguously (in other words, lowly) expressed.

For example, the output control unit 600 may allow clearer display of the virtual object as the degree of prediction accuracy is higher and may allow more ambiguous display of the virtual object as the degree of prediction accuracy is lower. More specifically, the output control unit 600 may allow the display of the virtual object in a further blurred manner as the degree of prediction accuracy is lower. This is because disturbance of the display such as display of the virtual object at a position separate from the real object, for example, can more easily occur as the degree of prediction accuracy is lower. In such a case, it is possible to weaken an impression of deviation by ambiguously (faintly, for example) displaying the virtual object itself even in a case in which the virtual object is displayed at a position separate from the real object. In this manner, even in the case in which the display of the virtual object is disturbed, it is possible to reduce the influence thereof by the ambiguous display. In a case in which the degree of prediction accuracy is high, the virtual object can be clearly displayed at an appropriate position. Specific UI examples related to such display control will be described later in detail with reference to FIGS. 10 to 12.

The output control unit 600 may allow the display of the virtual object to be display in accordance with a factor of a low degree of prediction accuracy. For example, the output control unit 600 selects a depiction method capable of further reducing the influence of the disturbance of the display depending on the factor. In this manner, even in the case in which the display of the virtual object is disturbed, it is possible to reduce the influence thereof.

Specific UI examples will be described later in detail.

In addition, although the description that the output control unit 600 controls the display of the virtual object has been given in the above description, more specifically, the output control unit 600 outputs information for allowing display of the virtual object to the display unit 700. In such a case, the output control unit 600 determines a region, a posture, a size, and the like in which the virtual object is depicted, generates image information of the rendered virtual object, and outputs the generated image information. Then, the display unit 700 performs the display on the basis of the image information.

(Display Unit 700)

The display unit 700 has a function of displaying information to the user. The display unit 700 displays the virtual object on the basis of the control by the output control unit 600. The display unit 700 may be a transmissive type display device that displays the virtual object while transmitting the real object that is present in the real space. In such a case, the information processing apparatus 1 is realized as a transmissive type HMD illustrated in FIG. 1, and the display unit 700 is realized as the display units 20A and 20B illustrated in FIG. 1. In addition, the display unit 700 may be a non-transmissive type display device that displays the imaged real object in real time and further displays the virtual object. In such a case, the information processing apparatus 1 can be realized as an immersive type (video through type) HMD.

(Supplementary Notes)

Although FIG. 5 shows the example in which the respective components are included in the same apparatus, the present technology is not limited to such an example. For example, the respective components of the information processing apparatus 1 may be separately included in a plurality of devices, and for example, can be separately included in a server that performs information processing and in a client that performs inputs and outputs. In addition, various sensors may be environmentally installed type devices. In addition, the time lag detected by the depiction delay detection unit 300 may include a communication delay or the like, for example.

Hereinafter, an example about what devices include the respective components in a case in which the functions of the information processing apparatus 1 are realized by cooperation of the plurality of devices will be described. Here, a device that has the display unit 700, such as an HMD, will also be referred to as a local device, and devices other than the local device, such as a server on a cloud, will also be referred to as external devices.

The real object detection unit 100 may be included in the local device or may be included in an external device. In a case in which a window glass of a vehicle functions as the display unit 700, for example, a camera outside the vehicle can function as the real object detection unit 100.

The real object recognition unit 120 may be included in the local device or may be included in an external device. For example, the entire recognition processing may be performed on the cloud, or a part of the recognition processing that requires a large load may be performed on the cloud.

The real object prediction unit 140 may be included in the local device or may be included in an external device. However, in the case in which the real object prediction unit 140 is included in the external device, latency increases, which can make it difficult to perform the prediction.

The viewpoint detection unit 200 may be included in the local device or may be included in an external device. In a case in which a window glass of a vehicle functions as the display unit 700, for example, a sensor included in an eyewear can function as the viewpoint detection unit 200.

The viewpoint recognition unit 220 may be included in the local device or may be included in an external device. However, it is desirable that the viewpoint recognition unit 220 is included on the same side as that of the viewpoint detection unit 200.

The viewpoint prediction unit 240 may be included in the local device or may be included in an external device. However, in a case in which the viewpoint prediction unit 240 is included in the external device, latency increases, which can make it difficult to perform the prediction.

It is desirable that the depiction delay detection unit 300 is included in the local device. This is for detecting a delay including a communication delay between the local device and the external device and the like.

The state-in-sight prediction unit 400 may be included in the local device or may be included in an external device. However, in the case in which the state-in-sight prediction unit 400 is included in the external device, latency increases, which can make it difficult to perform the prediction.

The prediction accuracy estimation unit 500 may be included in the local device or may be included in an external device. However, in the case in which the prediction accuracy estimation unit 500 is included in the external device, latency increases, which can make it difficult to perform the prediction.

The output control unit 600 may be included in the local device or may be included in both the local and external devices. For example, depiction of the virtual object may be performed on the cloud, and output positioning of the virtual object may be performed by the local device.

The configuration example of the information processing apparatus 1 according to the embodiment was described hitherto. Subsequently, a flow of processing that is executed in the information processing apparatus 1 will be described with reference to FIG. 6.

2.2 Flow of Processing

Figure 6:
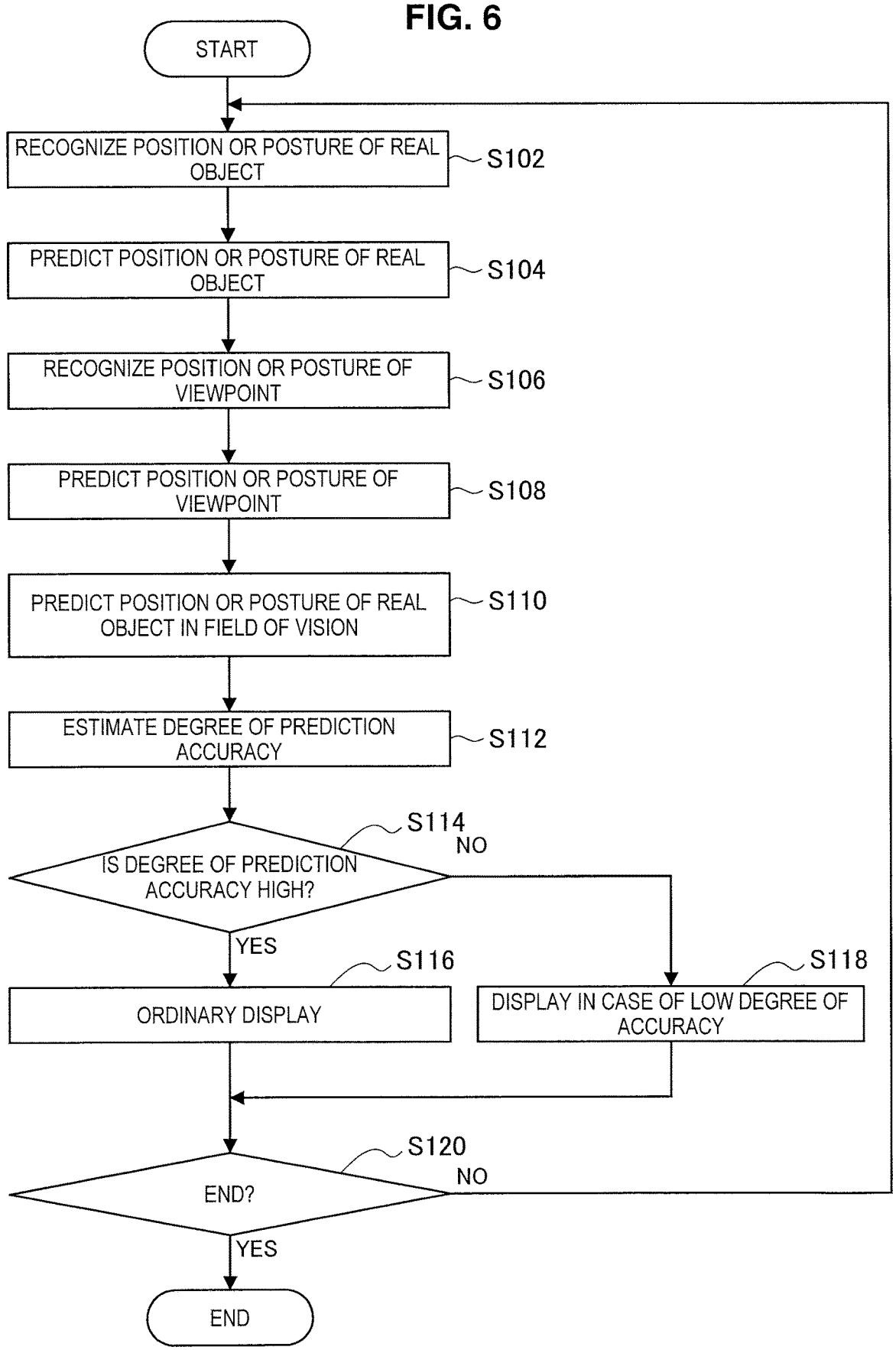
FIG. 6 is a flowchart illustrating an example of a flow of virtual object display control processing that is executed in the information processing apparatus according to the embodiment.

FIG. 6 is a flowchart illustrating an example of a flow of virtual object display control processing that is executed in the information processing apparatus 1 according to the embodiment.

As illustrated in FIG. 6, first, the real object recognition unit 120 recognizes the position or the posture of the real object on the basis of information that has been detected by the real object detection unit 100 at the detection time $T_0$(Step S102). Then, the real object prediction unit 140 predicts the position or the posture of the real object at the display time $T_2$ (Step S104).

In addition, the viewpoint recognition unit 220 recognizes the position or the posture of the viewpoint on the basis of information that has been detected by the viewpoint detection unit 200 at the detection time $T_0$ (Step S106). Then, the viewpoint prediction unit 240 predicts the position or the posture of the viewpoint at the display time $T_2$ (Step S108).

Then, the state-in-sight prediction unit 400 predicts the position or the posture of the real object in the field of vision on the basis of prediction results of the real object prediction unit 140 and the viewpoint prediction unit 240 (Step S110). Next, the prediction accuracy estimation unit 500 estimates a degree of prediction accuracy (Step S112). For computing the degree of prediction accuracy, the depiction delay detection unit 300 may detect the length of the time lag.

Then, the output control unit 600 determines whether or not the degree of prediction accuracy is higher than a threshold value (Step S114). In a case in which the degree of prediction accuracy is determined to be higher (Step S114/YES), the output control unit 600 causes the display unit 700 to display the virtual object by using an ordinary display method (Step S116). For example, the output control unit 600 displays the virtual object such that relevance with the real object is expressed to be high. Meanwhile, in a case in which the degree of prediction accuracy is determined to be lower (Step S114/NO), the output control unit 600 causes the display unit 700 to display the virtual object by using a display method for a case of a low degree of accuracy (Step S118). For example, the output control unit 600 displays the virtual object such that relevance with the real object is expressed to be low.

In a case in which the processing is continued thereafter (Step S120/NO), the processing returns to Step S102 again. In a case in which the processing is not continued (Step S120/YES), the processing is ended.

One example of the flow of the processing was described hitherto.

2.3 UI Example

Subsequently, a UI example will be described in detail with reference to FIGS. 7 to 22.

(1) Change in UI in accordance with degree of prediction accuracy

First, a change in a UI in accordance with a degree of prediction accuracy will be described.

Change in Size of Virtual Object

The information processing apparatus 1 (for example, the output control unit 600) may change the size of the virtual object in accordance with the degree of prediction accuracy. For example, the information processing apparatus 1 displays the virtual object to be larger as the degree of prediction accuracy is lower so as to include a region to be displayed. Also, the information processing apparatus 1 displays the virtual object to be smaller as the degree of prediction accuracy is lower so as to be included in the region to be displayed. Since the virtual object is prevented from being displayed at a position deviating from the region to be displayed by such processing, disturbance of the display is suppressed. Hereinafter, specific description will be given with reference to FIG. 7 for the former and FIG. 8 for the latter.

FIG. 7 is an explanatory diagram for explaining a UI example according to the embodiment. The UI example is a UI example on the assumption of an application that displays a virtual object within which a real object falls. In a case in which the degree of prediction accuracy is high, for example, the information processing apparatus 1 displays the virtual object 80 to be small as illustrated in the real space image 60A. Referring to the real space image 60A, since the degree of prediction accuracy is high, the real object 70 falls within the virtual object 80 even in the case of small display. Meanwhile, in a case in which the degree of prediction accuracy is low, the information processing apparatus 1 displays the virtual object 80 to be large as illustrated in the real space image 60B. Referring to the real space image 60B, since the degree of prediction accuracy is low, the position of the real object 70 deviates from the center of the virtual object 80 while the real object 70 falls within the virtual object. With such processing, at least the real object 70 falls within the virtual object 80.

FIG. 8 is an explanatory diagram for explaining a UI example according to the embodiment. The UI example is a UI example on the assumption of an application that superimposedly displays a virtual poster on a bulletin board. In a case in which the degree of prediction accuracy is high, for example, the information processing apparatus 1 displays a poster 80 with the size similar to that of a plate plane of a bulletin board 70 as illustrated in the real space image 60A. Meanwhile, in a case in which the degree of prediction accuracy is low, the information processing apparatus 1 displays the poster 80 with a smaller size than that of the plate plane of the bulletin board 70 as illustrated in the real space image 60B. With such processing, at least the poster 80 is superimposedly displayed on the plate plane of the bulletin board 70.

Display/Non-Display of Virtual Object

The information processing apparatus 1 (the output control unit 600, for example) may switch display/non-display of the virtual object in accordance with the degree of prediction accuracy. For example, the information processing apparatus 1 displays the virtual object in a case in which the degree of prediction accuracy is high and does not display the virtual object in a case in which the degree of prediction accuracy is low. In this manner, it is possible to suppress at least occurrence of disturbance of display in the case in which the degree of prediction accuracy is low. This point will be described with reference to FIG. 9.

Figure 9:
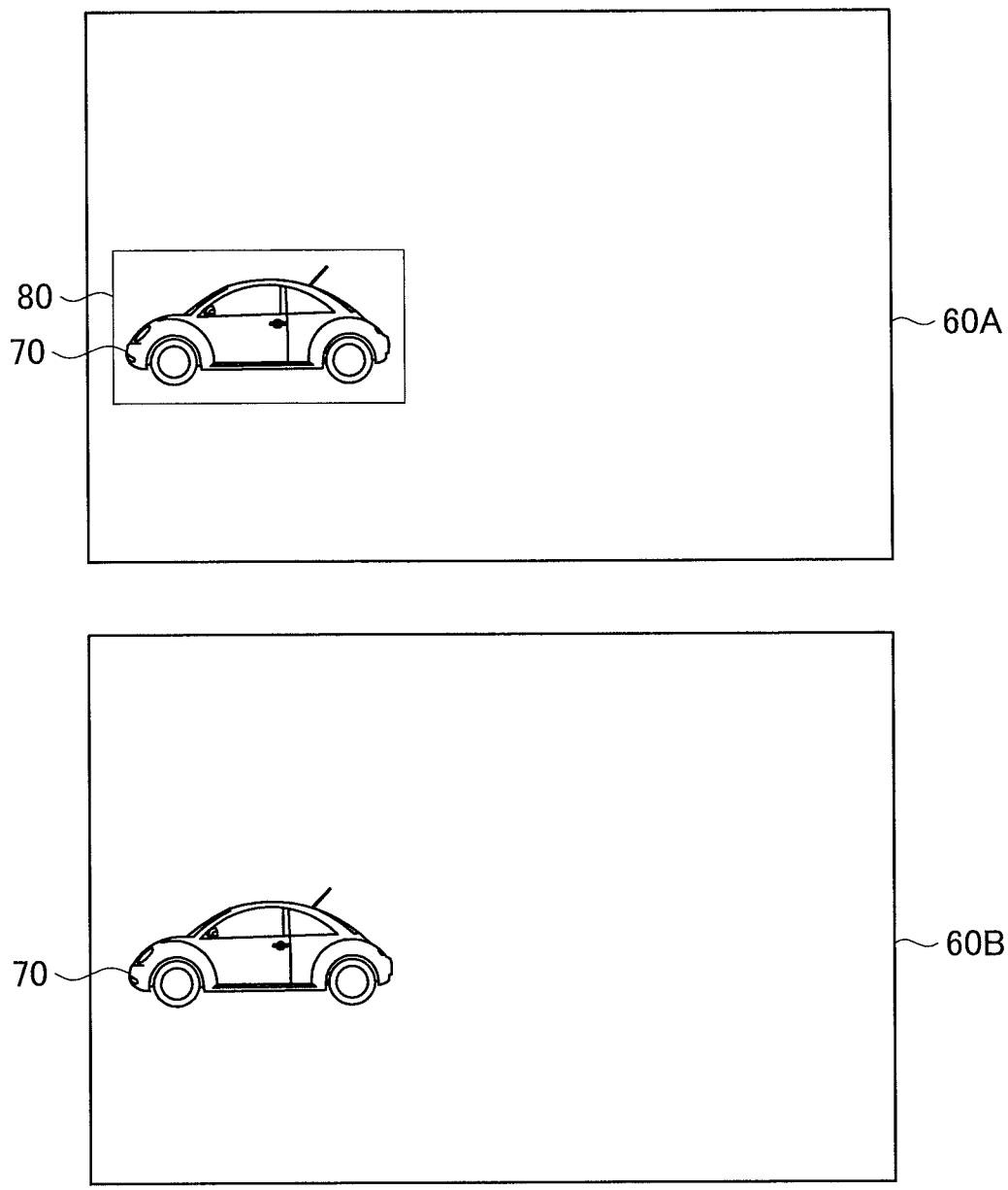
FIG. 9 is an explanatory diagram for explaining a UI example according to the embodiment.

FIG. 9 is an explanatory diagram for explaining a UI example according to the embodiment. The UI example is a UI example on the assumption of an application that displays a virtual object within which a real object falls in a manner similar to that in FIG. 7. In a case in which the degree of prediction accuracy is high, for example, the information processing apparatus 1 displays the virtual object 80 to be small as illustrated in the real space image 60A. Referring to the real space image 60A, since the degree of prediction accuracy is high, the real object 70 falls within the virtual object 80 even in the case of small display. Meanwhile, in a case in which the degree of prediction accuracy is low, the information processing apparatus 1 does not display the virtual object 80 as illustrated in the real space image 60B. With such processing, it is possible to suppress at least the disturbance of the display.

Change in Virtual Object Depiction Effect

The information processing apparatus 1 (the output control unit 600, for example) may change a depiction effect to be applied to the virtual object in accordance with the degree of prediction accuracy. For example, the information processing apparatus 1 applies an animation that makes a boundary of the virtual object more ambiguous as the degree of prediction accuracy is lower. In this manner, even in a case in which the display of the virtual object is disturbed, it is possible to reduce the influence thereof. Various depiction effects to be employed can be considered. Hereinafter, motion blur processing will be described with reference to FIGS. 10 and 11, and mask processing will be described with reference to FIG. 12 as typical examples thereof.

(Motion Blur Processing)

The information processing apparatus 1 can apply the motion blur processing to the virtual object and display the virtual object to which the motion blur has been added. First, an application policy of the motion blur processing will be described with reference to FIG. 10.

Figure 10:
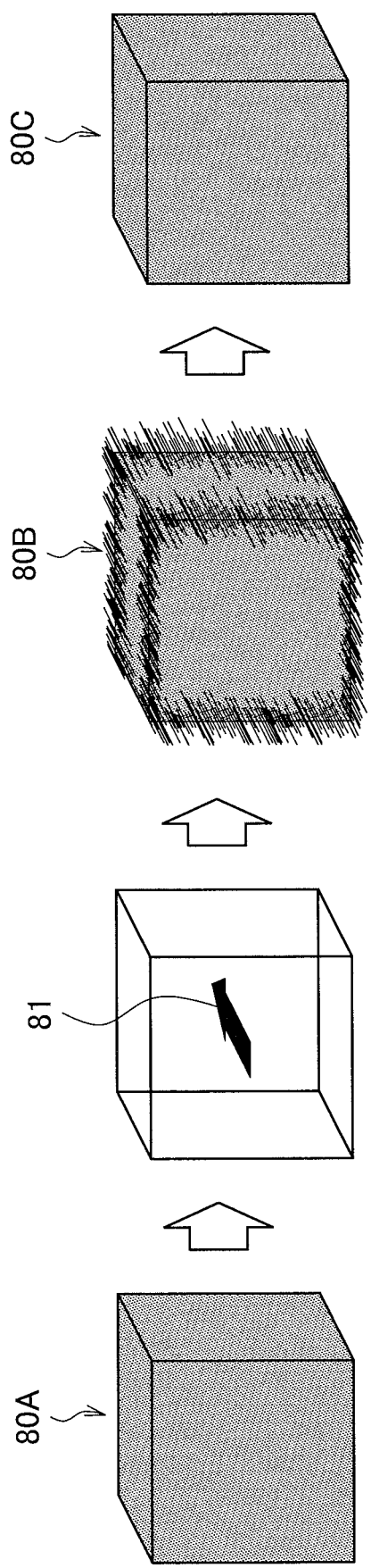
FIG. 10 is an explanatory diagram for explaining a UI example according to the embodiment.

FIG. 10 is an explanatory diagram for explaining a UI example according to the embodiment. A virtual object 80A is assumed to be displayed as a default. The information processing apparatus 1 depicts a virtual object 80B to which the motion blur processing in a moving direction 81 by a predetermined amount or only for a moment has been applied if the degree of prediction accuracy of the amount of movement of the virtual object 80A in the moving direction 81 in the field of vision decreases. In this manner, the boundary of the virtual object becomes ambiguous. In a case in which the degree of prediction accuracy is recovered, the information processing apparatus 1 depicts again a virtual object 80C to which the application of the motion blur processing has been stopped.

The application policy of the motion blur processing was described hitherto. Subsequently, a specific example of the motion blur processing will be described with reference to FIG. 11.

Figure 11:
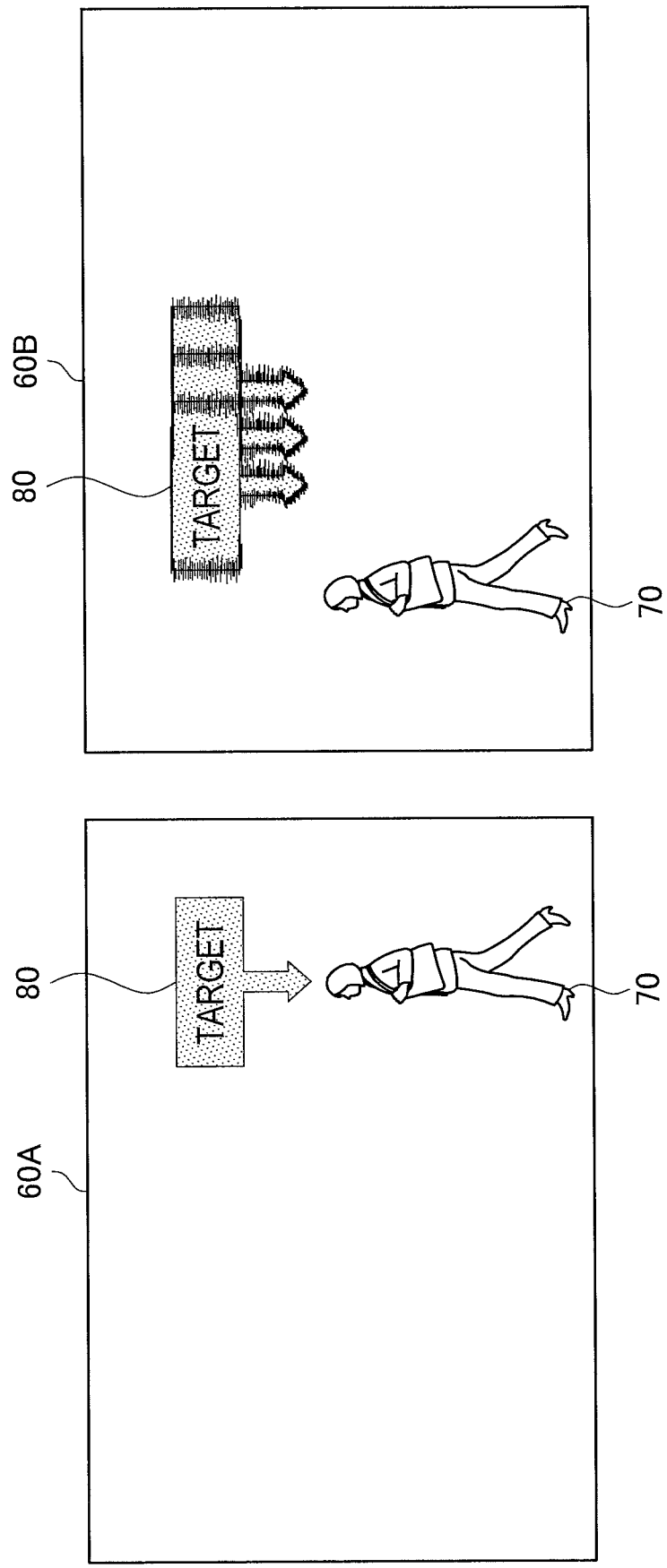
FIG. 11 is an explanatory diagram for explaining a UI example according to the embodiment.

FIG. 11 is an explanatory diagram for explaining a UI example according to the embodiment. The UI example is a UI example on the assumption of an application that displays a speech balloon with respect to the real object. In a case in which the degree of prediction accuracy is high, for example, the information processing apparatus 1 does not apply the motion blur processing and clearly displays a speech balloon 80 as illustrated in the real space image 60A. Referring to the real space image 60A, since the degree of prediction accuracy is high, the speech balloon 80 correctly indicates a person 70. Meanwhile, in a case in which the degree of prediction accuracy is low, the information processing apparatus 1 displays the speech balloon 80 to which the motion blur processing has been applied as illustrated in the real space image 60B. Referring to the real space image 60B, since the degree of prediction accuracy is low, and the position indicated by the speech balloon 80 deviates from the person 70 while the position indicated by the speech balloon 80 is ambiguously displayed, the deviation of the display does not significantly appear. Furthermore, since the motion blur processing has been applied so as to follow motion of the person 70, the speech balloon 80 following the person 70 is expressed. With such processing, it is possible to reduce the influence of the disturbance of the display.

(Mask Processing)

The information processing apparatus 1 can apply the mask processing to the virtual object, for example, and display the virtual object with a lighter tone at a further outward edge. Hereinafter, an application policy of the mask processing will be described with reference to FIG. 12.

Figure 12:
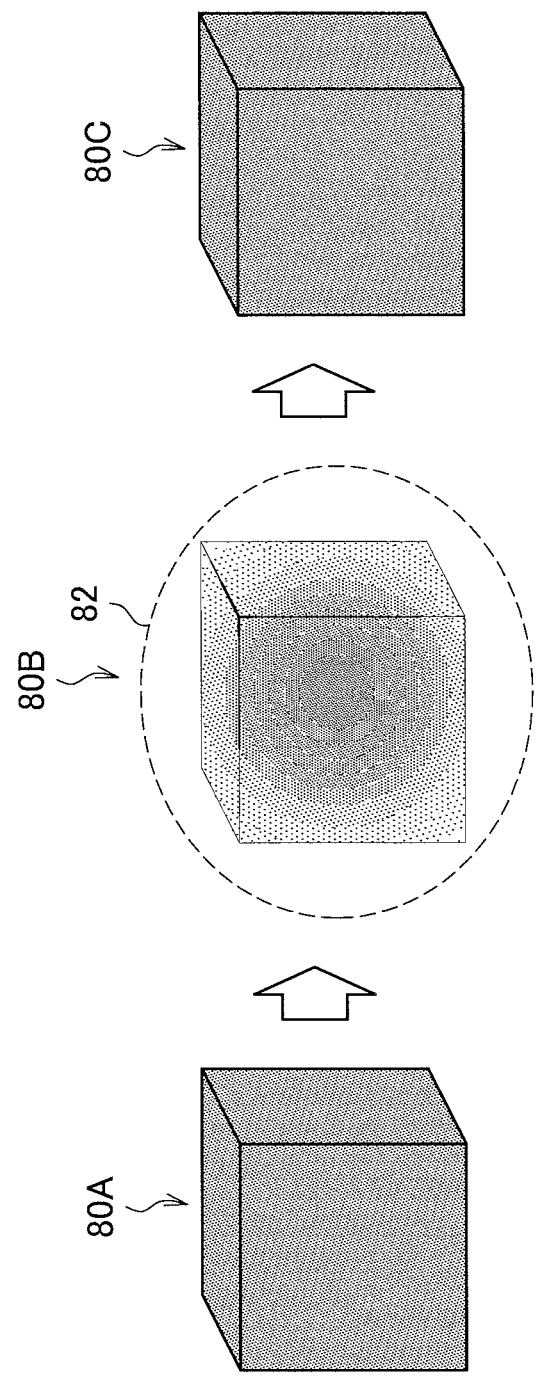
FIG. 12 is an explanatory diagram for explaining a UI example according to the embodiment.

FIG. 12 is an explanatory diagram for explaining a UI example according to the embodiment. The virtual object 80A is assumed to be displayed as a default. The information processing apparatus 1 depicts the virtual object 80B with an ambiguous boundary by superimposedly depicting a circle 82 with such a size that covers the virtual object if the degree of prediction accuracy related to motion of the virtual object 80A in the field of vision decreases. It is desirable that the circle 82 has lower transmittance at the further outward edge and has higher transmittance toward the center. In such a case, the more ambiguous display toward the boundary is realized as illustrated as the virtual object 80B. In a case in which the degree of prediction accuracy is recovered, the information processing apparatus 1 depicts again the virtual object 80C to which the application of the mask processing has been stopped.

(2) Change in Depiction Scheme in Accordance with Factor of Decrease in Degree of Accuracy Subsequently, a change in a depiction scheme in accordance with a factor of a decrease in a degree of accuracy will be described.

The information processing apparatus 1 (output control unit 600) may change the virtual object depiction scheme in accordance with a factor of a low degree of prediction accuracy. In a case in which the factor of the low degree of prediction accuracy arises from motion of the viewpoint (for example, large motion of the viewpoint or the like), for example, the information processing apparatus 1 does not display the virtual object. Meanwhile, in a case in which the factor of the low degree of prediction accuracy arises from motion of the real object (for example, large motion of the real object or the like), the information processing apparatus 1 applies the motion blur processing to the virtual object. Hereinafter, a flow of processing related to the change in the depiction method in accordance with the factor of the decrease in the degree of accuracy will be described with reference to FIG. 13.

Figure 13:
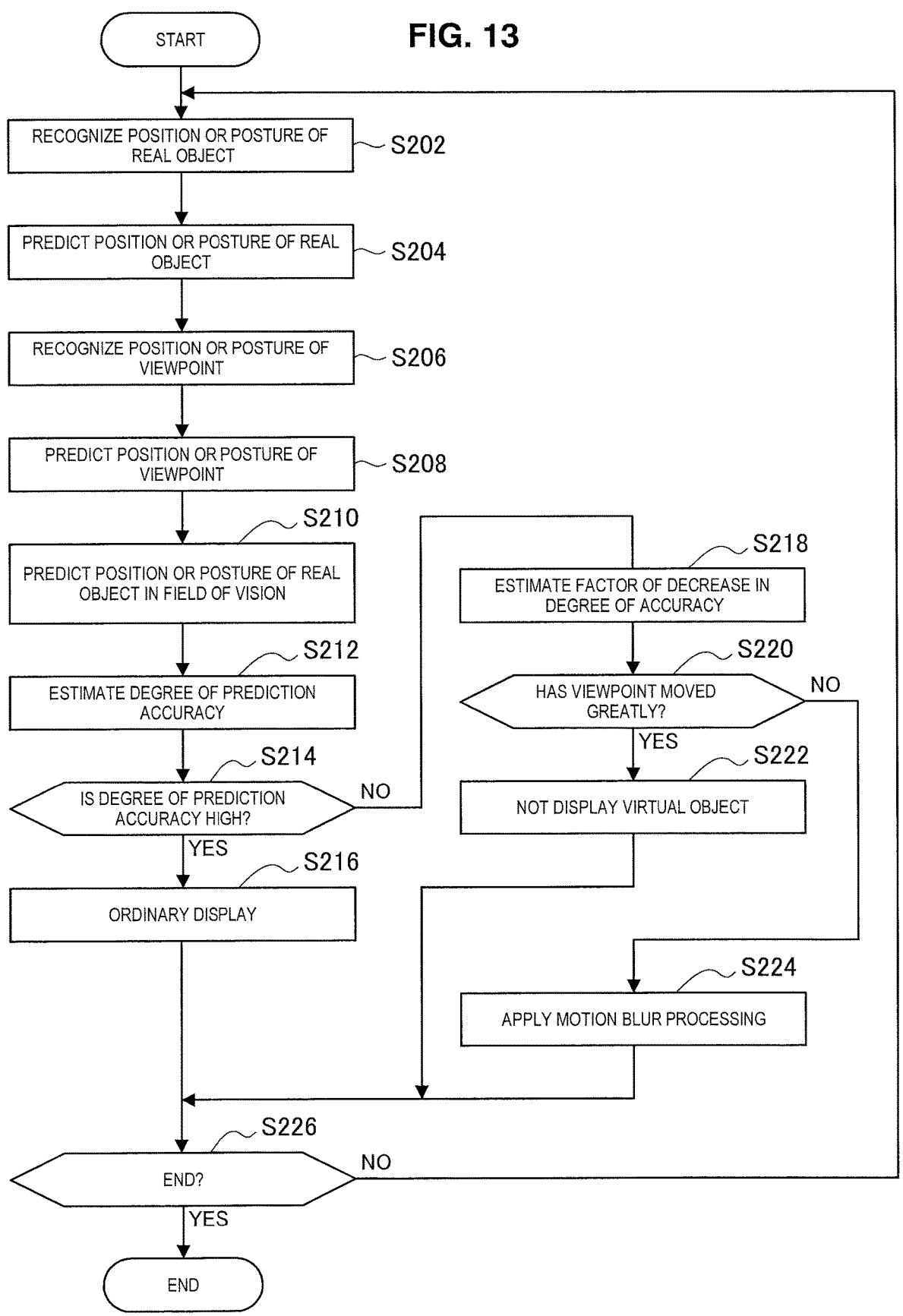
FIG. 13 is a flowchart illustrating an example of a flow of virtual object display control processing that is executed in the information processing apparatus according to the embodiment.

FIG. 13 is a flowchart illustrating an example of a flow of virtual object display control processing that is executed in the information processing apparatus 1 according to the embodiment. Since processing related to Steps S202 to S216 is similar to the processing related to S102 to S116 described above with reference to FIG. 6, detailed description will be omitted herein.

In a case in which the degree of prediction accuracy is determined to be low (Step S214/NO) in Step S214, the prediction accuracy estimation unit 500 estimates a factor of the low degree of prediction accuracy (Step S218).

In a case in which the factor of the low degree of prediction accuracy is estimated to be large motion of the viewpoint (Step S220/YES), the output control unit 600 does not display the virtual object (Step S222). Meanwhile, in a case in which the factor of the low degree of prediction accuracy is large motion of the real object or the like and is estimated not to be large motion of the viewpoint (Step S220/NO), the output control unit 600 applies the motion blur processing to the virtual object (Step S224).

In a case in which the processing is continued thereafter (Step S226/NO), the processing returns to Step S202 again. In a case in which the processing is not continued (Step S226/YES), the processing is ended.

(3) Change in Display in Accordance with Situation

Subsequently, a change in display in accordance with a situation will be described.

The information processing apparatus 1 (output control unit 600) can control the display of the virtual object on the basis of various kinds of information. For example, the information processing apparatus 1 can control the display of the virtual object on the basis of information related to the user, information related to the virtual object, information related to the real object, information related to an environment, information related to the information processing apparatus 1, or the like.

As the information related to the user, a focused point (a line of sight or focal point), a behavior recognition result (staying, walking, running, moving up or down stairs, driving a car, a kind of sports), a moving velocity, biological information (a heart rate, a body temperature, sweating, a blood pressure, sweating, a pulse, aspiration, palpebration, eyeball motion, a gazing time, a size of a pupil diameter, a blood pressure, a brainwave, body motion, a body position, a skin temperature, skin electric resistance, micro-vibration (MV), a myopotential, a blood oxygen saturation level (SPO2), a result of estimating a feeling (delight, anger, sorrow, and pleasure), a posture of the user, a position of the user, user setting (manual input), and the like, for example, are exemplified.

As the information related to the virtual object, a display size, a display position, a display posture, display animation aspects (a moving velocity, a moving direction, a track, an updating frequency), content attribute (a type, importance, priority, an application type (a browser, a map, a mailer, an IME, an SNS)), a resolution, a color, and the like, for example, are exemplified.

As the information related to the information related to the real object, a kind, a shape, a position, a posture, a material, a color, and the like of the real object, for example, are exemplified.

As the information related to the environment, a background (important information, a background color), illuminance, a location (indoor, outdoor, a situation (geofence), a behavior history (whether or not the user is staying at a familiar location), a circumferential situation (presence and density of other persons, cars, and the like), a time, a height, a temperature, a wind direction, an amount of wind, and the like are exemplified.

As the information related to the information processing apparatus 1, a display resolution, a display scheme, presence of a sensor, an ID, a remaining amount of a battery, battery capacity, presence of an external storage medium slot, a communication scheme, acoustic properties, properties of an imager, a 3D imaging performance, a 3D display performance, a posture of the device, a position of the device, and the like are exemplified. In a case in which the information processing apparatus 1 is realized as an HMD, the information related to the information processing apparatus 1 can include an HMD scheme. Alternatively, in a case in which the information processing apparatus 1 is realized as a wearable device, the information related to the information processing apparatus 1 can include a mounted state (mounting, non-mounting, a mounting location) of the wearable device, a mounting position, and the like.

Hereinafter, a specific example of the change of the display in accordance with the information related to the virtual object will be described as an example.

Change in Display in Accordance with Contents of Content

Figure 14:
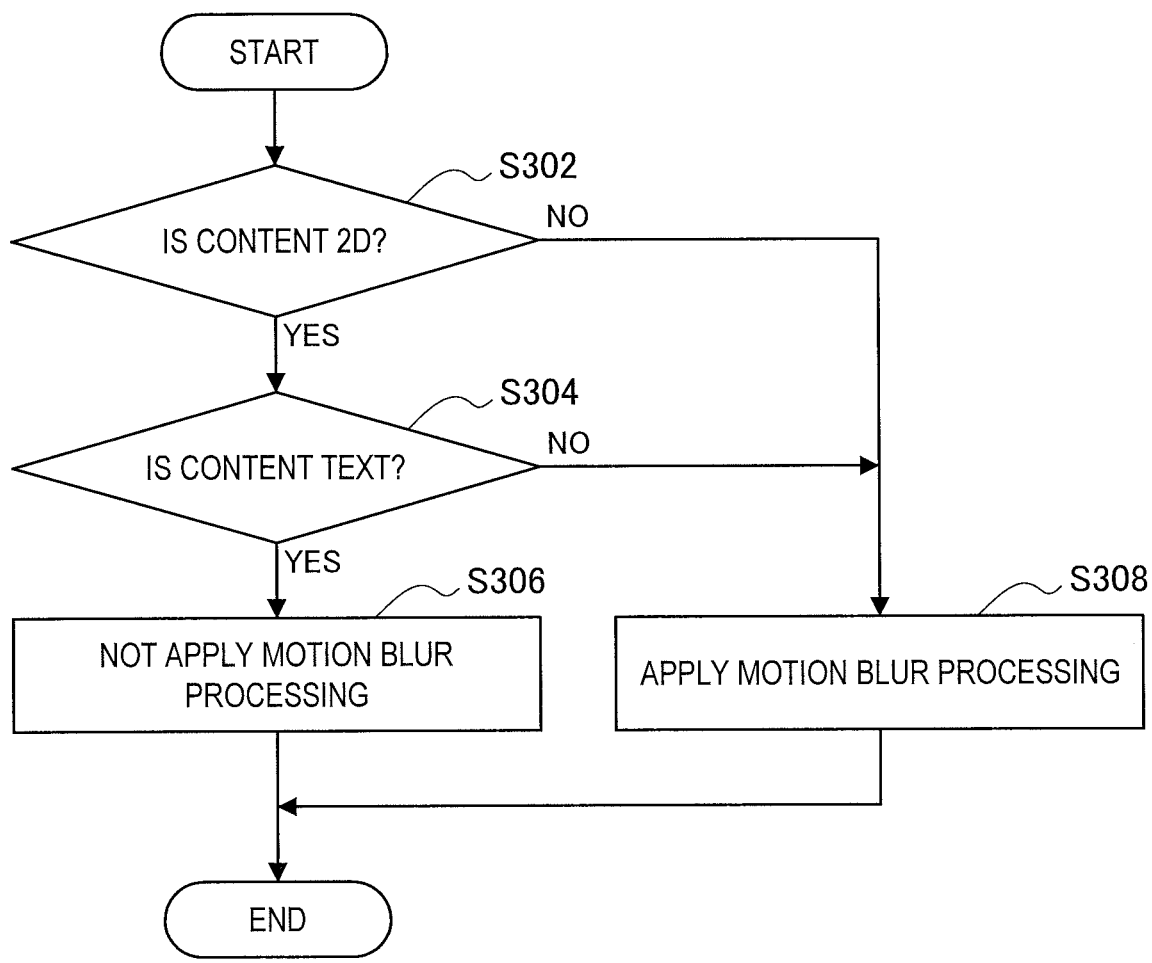
FIG. 14 is a flowchart illustrating an example of a flow of virtual object display control processing that is executed in the information processing apparatus according to the embodiment.

FIG. 14 is a flowchart illustrating an example of a flow of virtual object display control processing that is executed in the information processing apparatus 1 according to the embodiment.

As illustrated in FIG. 14, the output control unit 600 does not apply the motion blur processing to the virtual object (Step S306) in a case in which the content is two dimensional and is a text (Step S302/YES and Step S304/YES). This is because it becomes difficult to read the text if the motion blur processing is applied. Meanwhile, the output control unit 600 applies the motion blur processing to the virtual object (Step S308) in a case in which the content is not two dimensional or is not a text (Step S302/NO or Step S304/NO).

The processing is ended as described above. Also, 3D display control processing, which will be described later, may be executed in a case in which the content is 3D.

Change in Display in Accordance with Virtual Object Display Position

For example, the information processing apparatus 1 (the output control unit 600, for example) may change the display of the virtual object in accordance with the distance between the user position and the virtual object display position (the position in the real space). Hereinafter, the content of the virtual object is assumed to be three dimensional.

Figure 15:
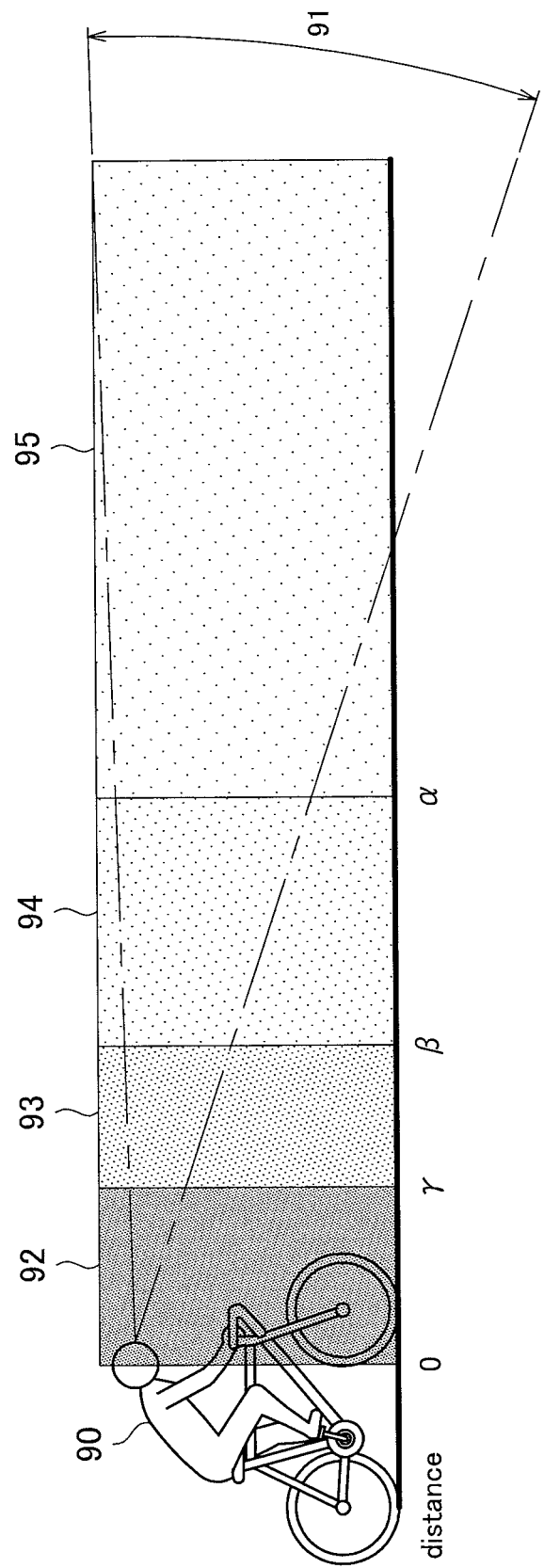
FIG. 15 is an explanatory diagram for explaining a UI example according to the embodiment.

FIG. 15 is an explanatory diagram for explaining a UI example according to the embodiment. A situation in which a virtual object is displayed in a field of vision 91 in front of a user 90 who is riding a bicycle is assumed. As illustrated in FIG. 15, the space in front of 90 is sectioned into a space 92 in which a distance from the user is up to γ, a space 93 in which the distance is from γ to β, a space 94 in which the distance is from β to α, and a space 95 in which the distance is equal to or greater than α. In addition, values of α, β, and γ may be predetermined values or may vary in accordance with a user moving velocity or the like, for example. The information processing apparatus 1 can switch a depiction scheme to be applied in accordance with which of the spaces the virtual object display position belongs to. Hereinafter, details of a flow of the processing will be described with reference to FIG. 16.

Figure 16:
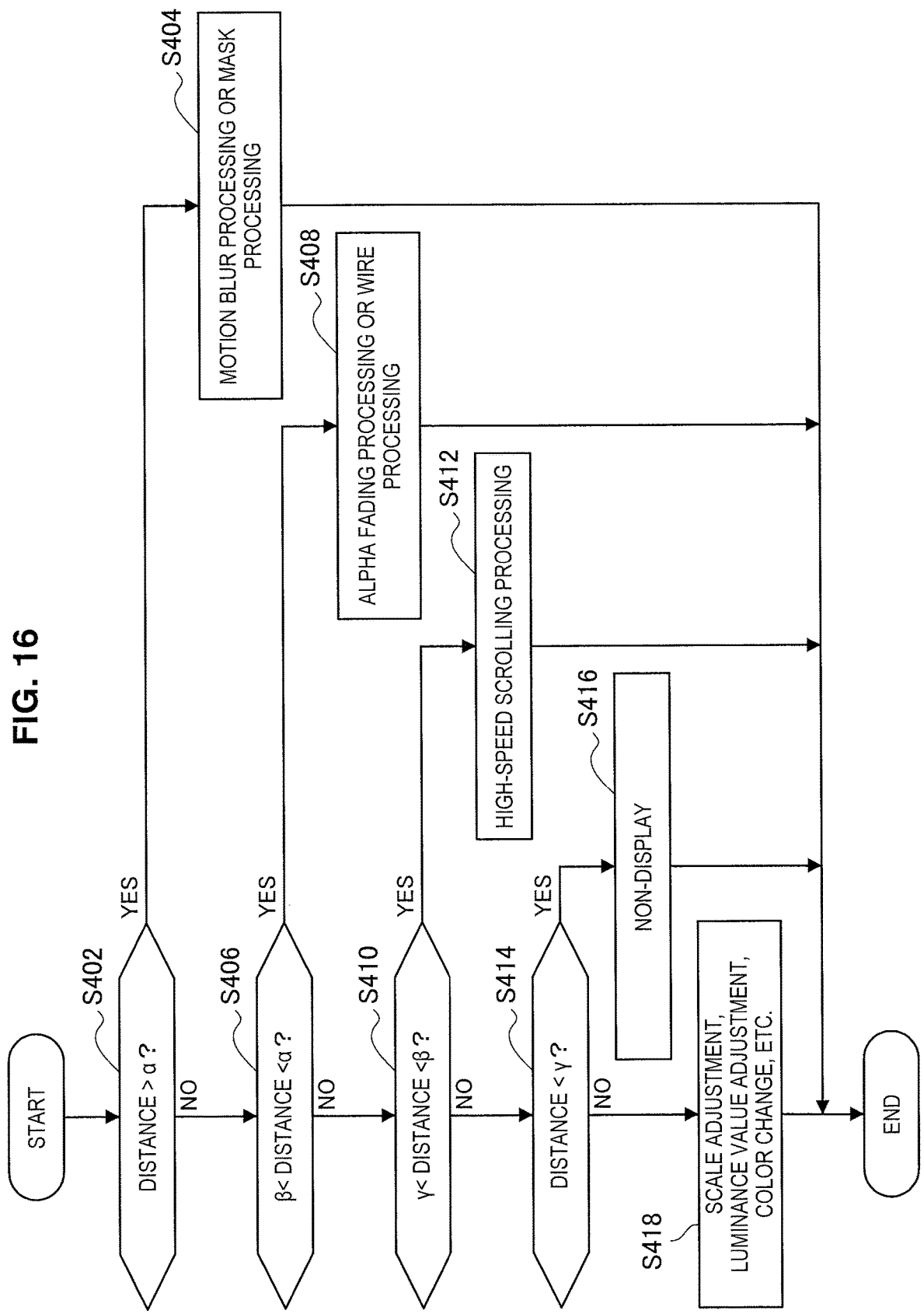
FIG. 16 is a flowchart illustrating an example of a flow of virtual object display control processing that is executed in the information processing apparatus according to the embodiment.

FIG. 16 is a flowchart illustrating an example of a flow of the virtual object display control processing that is executed in the information processing apparatus 1 according to the embodiment.

As illustrated in FIG. 16, the output control unit 600 applies the motion blur processing or the mask processing to the virtual object (Step S404) in a case in which the distance from the user to the virtual object display position exceeds α (Step S402/YES).

Alternatively, the output control unit 600 applies alpha fading processing or wire processing to the virtual object (Step S408) in a case in which the distance from the user to the virtual object display position is less than α (Step S402/NO) and exceeds β (Step S406/YES).

Alternatively, the output control unit 600 applies high-speed scrolling processing to the virtual object (Step S412) in a case in which the distance from the user to the virtual object display position is less than β (Step S406/NO) and exceeds γ (Step S410/YES). The high-speed scrolling processing swill be described later in detail.

Alternatively, the output control unit 600 does not display the virtual object (Step S416) in a case in which the distance from the user to the virtual object display position is less than γ (Step S410/NO and Step S414/YES).

Alternatively, the output control unit 600 applies scale adjustment, luminance value adjustment, a color change, and the like to the virtual object in a case in which the distance from the user to the virtual object display position is not less than γ (Step S414/NO). This step can be executed in a case in which there is no distance or the like, for example, in a case in which the virtual object adheres to the display plane.

The processing is ended as described above.

Figure 17:
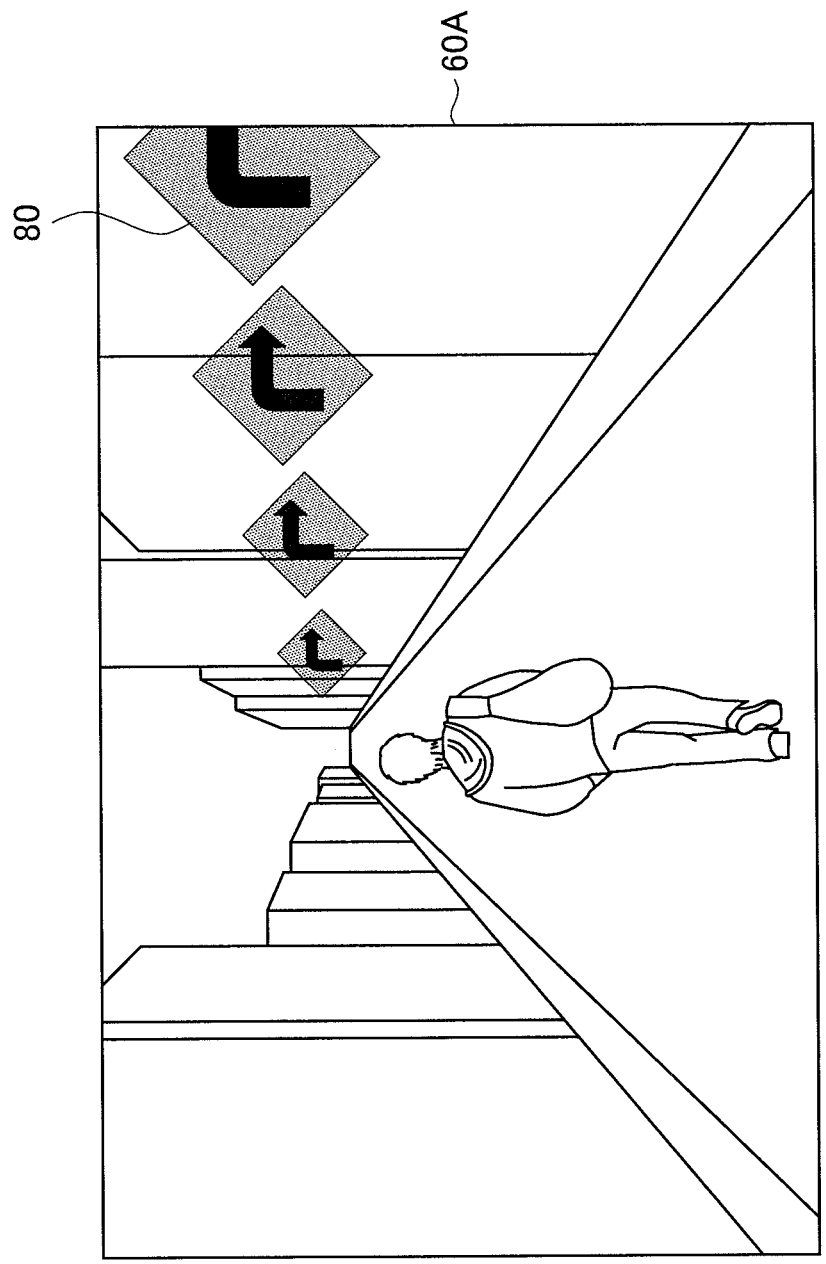
FIG. 17 is an explanatory diagram for explaining a UI example according to the embodiment.
Figure 18:
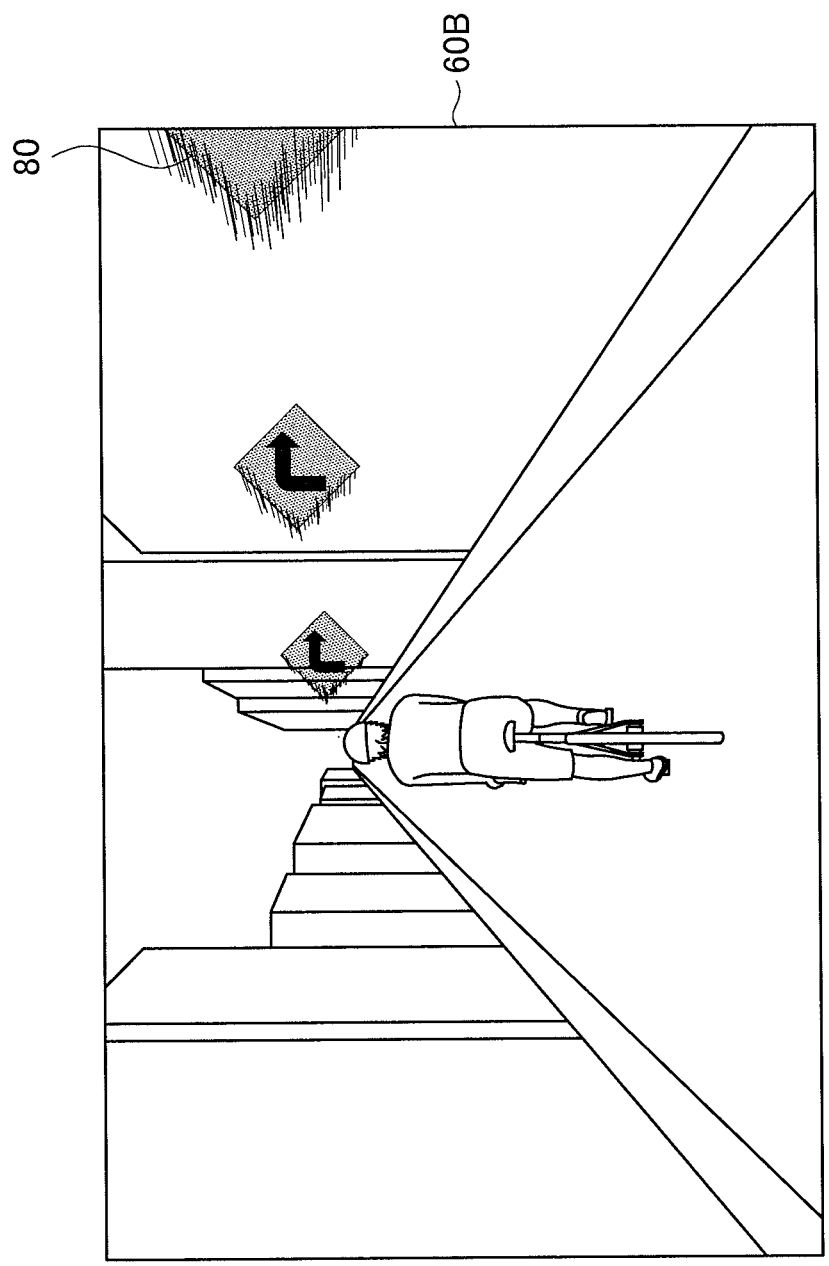
FIG. 18 is an explanatory diagram for explaining a UI example according to the embodiment.

Subsequently, the high-speed scrolling processing will be described with reference to FIGS. 17 and 18. FIGS. 17 and 18 are explanatory diagrams for explaining UI examples according to the embodiment.

FIG. 17 shows a UI example in which the high-speed scrolling processing has not been applied. The real space image 60A illustrated in FIG. 17 includes a person who is walking in front of the user who is walking, and a plurality of signs 80 are displayed as virtual objects at equal intervals.

On the assumption that the positions of the signs 80 in the real space are fixed, the positions of the signs 80 on the display plane vary in accordance with the amount of movement of the user in a case in which the user moves. Since the user moves in parallel with the signs 80 that are aligned in a depth direction of the real space image 60A in the example illustrated in FIG. 17, the signs 80 move toward an image frame in accordance with the movement of the user and are not displayed if the signs 80 exit the image frame to the outside. Therefore, for a sign 80 that overlaps the image frame, only a part thereof within the image frame is displayed in the real space image 60A.

FIG. 18 illustrates a UI example to which the high-speed scrolling processing has been applied. The real space image 60B illustrated in FIG. 18 includes a person who is traveling by bicycle in front of the user who is traveling by bicycle, and a plurality of signs 80 are displayed in a manner similar to that in FIG. 17. However, since the user moving velocity is higher in the example illustrated in FIG. 18 than that in the example illustrated in FIG. 17, the speed at which the signs 80 move toward the image frame is high. Therefore, the signs 80 are further accelerated (at a larger interval) and more ambiguously displayed toward the image frame when the signs 80 move toward the image frame in the example illustrated in FIG. 18. In other words, the signs 80 are further accelerated as the user approaches the signs 80. In this manner, since the signs 80 located near the image frame exit the image frame earlier, a time during which only a part of the sign 80 that overlaps the image frame within the image frame is displayed is shortened. Also, the virtual object being further accelerated and more ambiguously displayed as the virtual object approaches the user and is located closer to the image frame has an effect of reducing unnatural display of the virtual object from a viewpoint that a human recognizes a substance located at a further position as being moving more slowly and recognizes a substance located at a closer position as being moving faster even if the substances are moving at the same velocity. Also, the positions of the signs 80 in the real space may temporarily vary when the signs 80 are accelerated.

(4) Setting UI

Subsequently, a setting UI will be described.

The information processing apparatus 1 (the output control unit 600, for example) may display a screen for setting related to display of the virtual object. The user can use the setting UI to set strength of the motion blur, acceleration of the high-speed scrolling processing, and the like. Hereinafter, a flow of the processing related to the display of the setting UI and UI examples will be described with reference to FIGS. 19 to 22.

Figure 19:
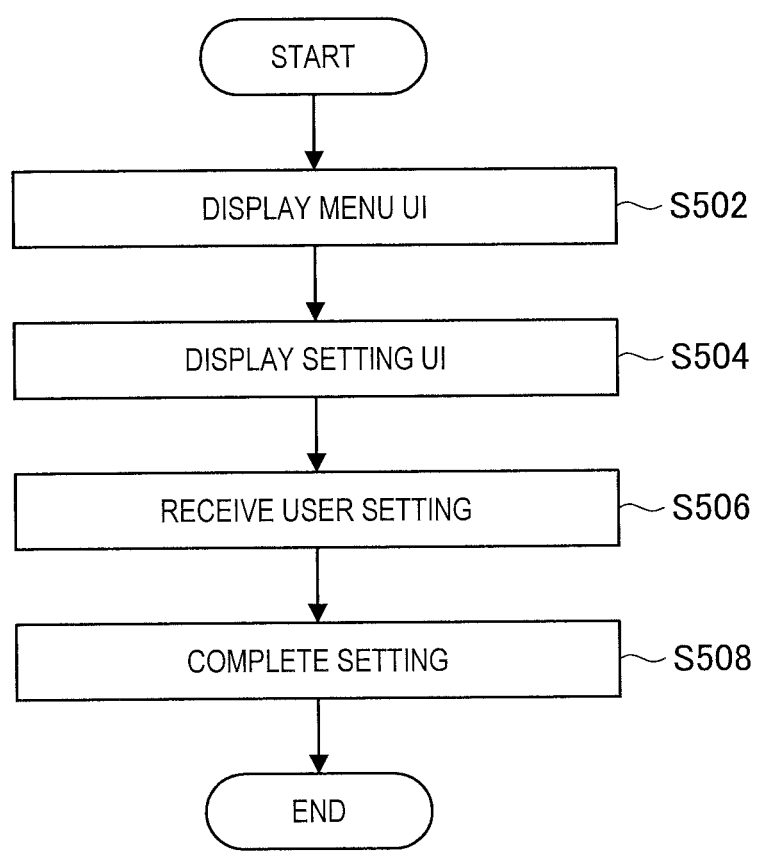
FIG. 19 is a flowchart illustrating an example of a flow of virtual object display control processing that is executed in the information processing apparatus according to the embodiment.

FIG. 19 is a flowchart illustrating an example of a flow of virtual object display control processing that is executed in the information processing apparatus 1 according to the embodiment.

Figure 20:
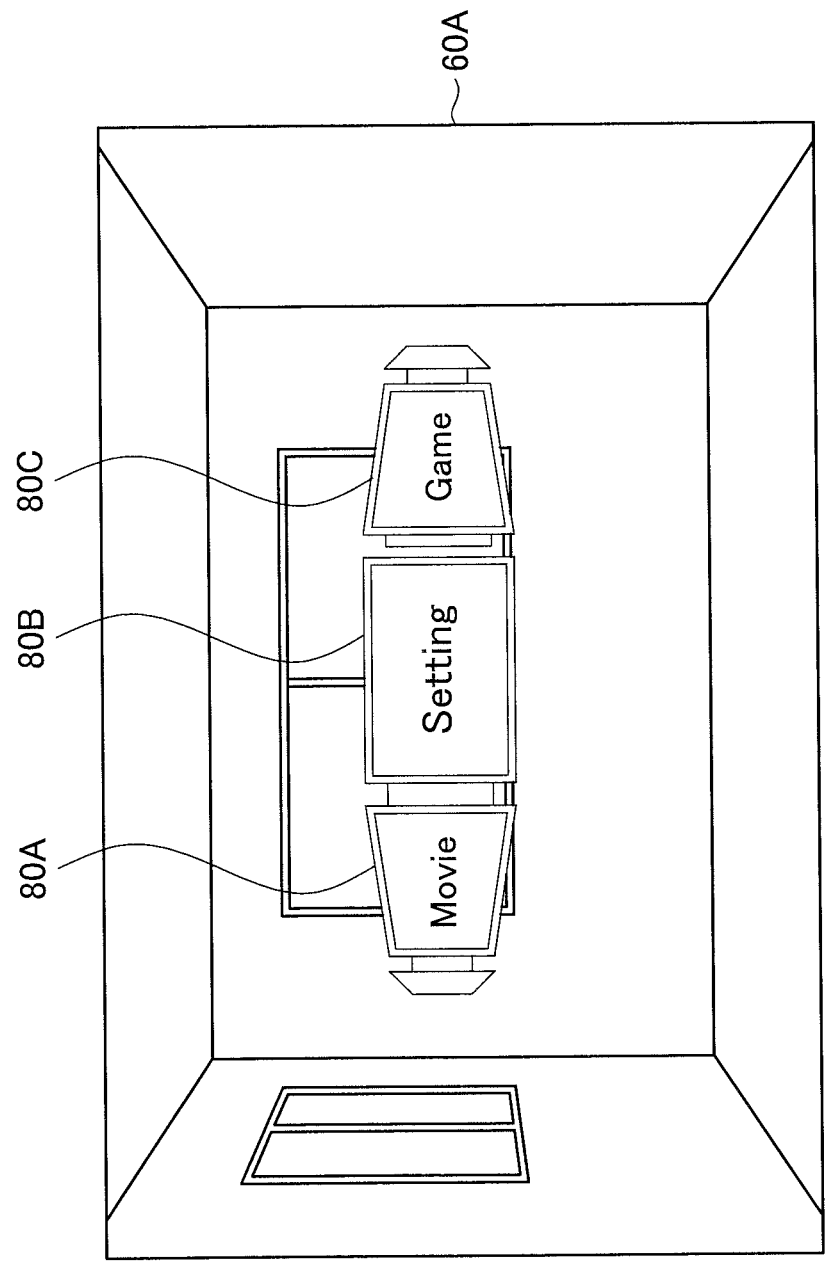
FIG. 20 is an explanatory diagram for explaining a UI example according to the embodiment.

As illustrated in FIG. 19, first, the output control unit 600 displays a menu UI (Step S502). One example of the menu UI is illustrated in FIG. 20. FIG. 20 is an explanatory diagram for explaining a UI example according to the embodiment. As illustrated in FIG. 20, menu items 80A to 80C are displayed as virtual objects in the real space image 60A. The menu item 80A is a menu item for reproducing a movie. The menu item 80B is a menu item for display setting. The menu item 80C is a menu item for executing a game.

If the menu item 80B is selected by the user, the output control unit 600 displays the setting UI (Step S504). Then, the information processing apparatus 1 (the real object recognition unit 120 or the viewpoint detection unit 200, for example) receives user setting (Step S506) and completes the setting (Step S508). Here, reception of the user setting will be described with reference to FIGS. 21 and 22.

Figure 21:
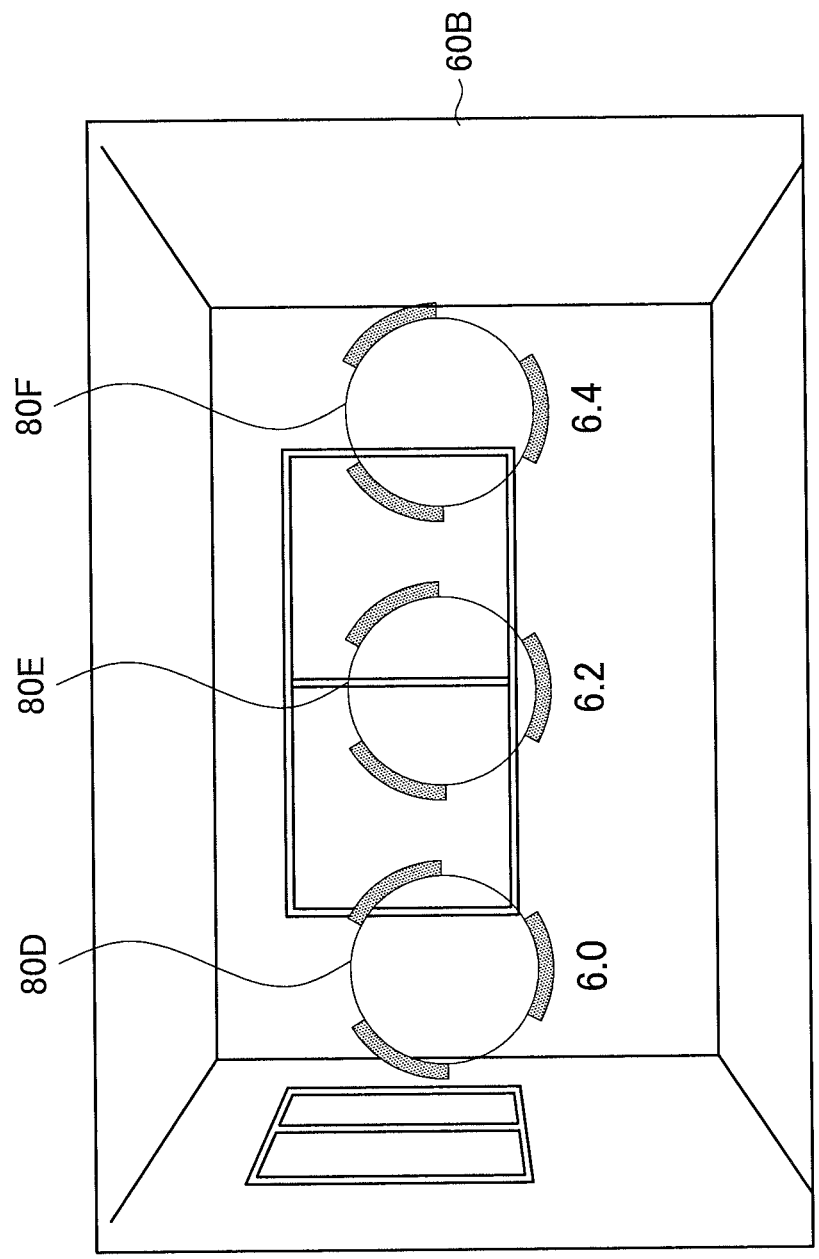
FIG. 21 is an explanatory diagram for explaining a UI example according to the embodiment.

FIG. 21 is an explanatory diagram for explaining a UI example according to the embodiment. In the real space image 60B, icons 80D to 80F are displayed as a setting UI for setting a range or strength of an application of motion blur. These icons are assumed to be fixed in the real space surrounding the user. If the icon 80D is selected, the strength of the motion blur is set to 6.0. If the icon 80E is selected, the strength of the motion blur is set to 6.2. If the icon 80F is selected, the strength of the motion blur is set to 6.4. In addition, these numbers are just examples. The user can select the icon and set the strength of the motion blur by shaking the head to the left and the right to cause any of the icons 80D to 80F to be positioned at the front or by directing the line of sight to any of the icons 80D to 80F.

Figure 22:
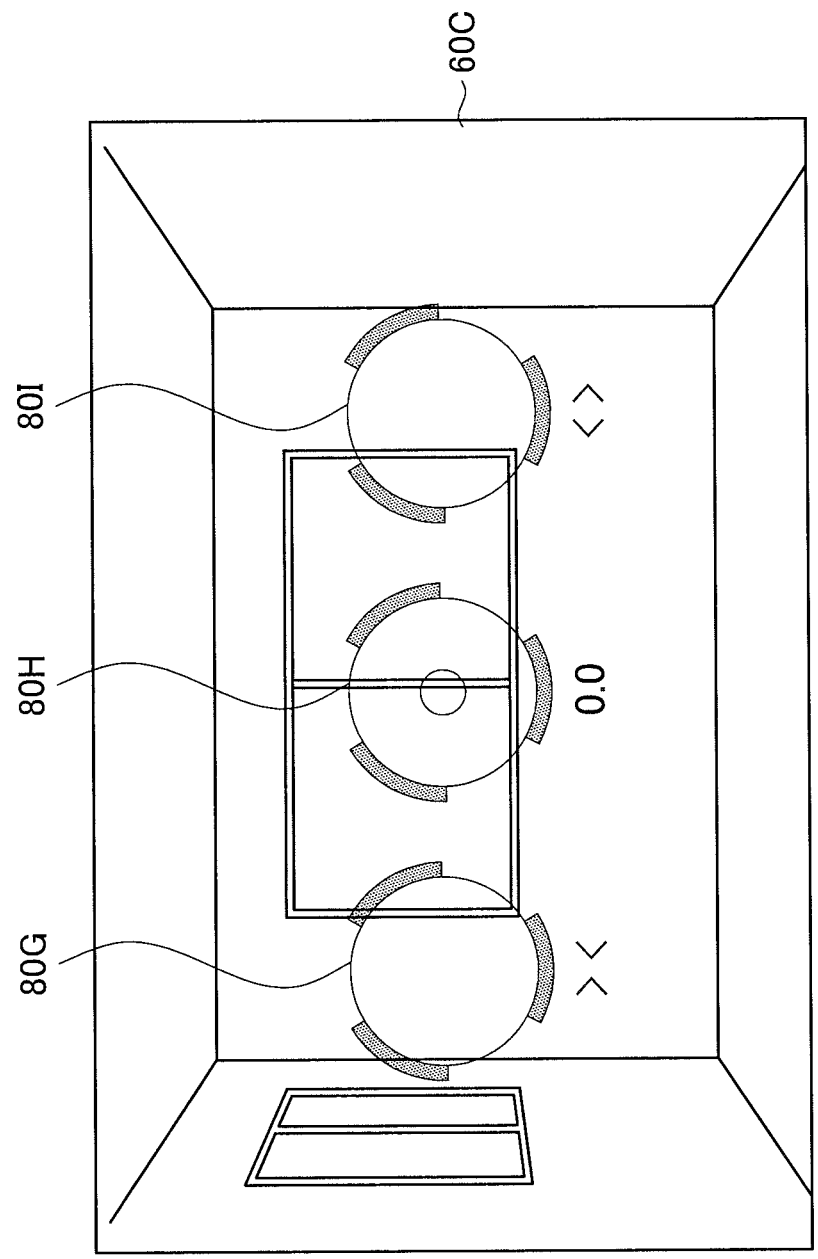
FIG. 22 is an explanatory diagram for explaining a UI example according to the embodiment.

FIG. 22 is an explanatory diagram for explaining a UI example according to the embodiment. In the real space image 60C, icons 80G to 80I are displayed as a setting UI for setting a range or strength of an application of motion blur. These icons are assumed to be fixed in the real space surrounding the user. The icon 80H indicates a motion blur strength setting value. If the icon 80G is selected, the motion blur strength setting value of the icon 80H decreases. If the icon 80I is selected, the motion blur strength setting value of the icon 80H increases. If the icon 80H is selected, the motion blur strength setting is completed. The user can select the icon and set the strength of the motion blur by shaking the head to the left and the right to cause any of the icons 80G to 80I to be positioned at the front or directing the line of sight to any of the icons 80G to 80I.

The UI examples provided by the information processing apparatus 1 according to the embodiment were described hitherto.

3. APPLICATION EXAMPLES TO SEE-THROUGH-TYPE HMD

Subsequently, a configuration example in a case in which the information processing apparatus 1 according to the first embodiment described above is realized as a see-through-type HMD will be described.

3.1 Configuration Example 1

Figure 23:
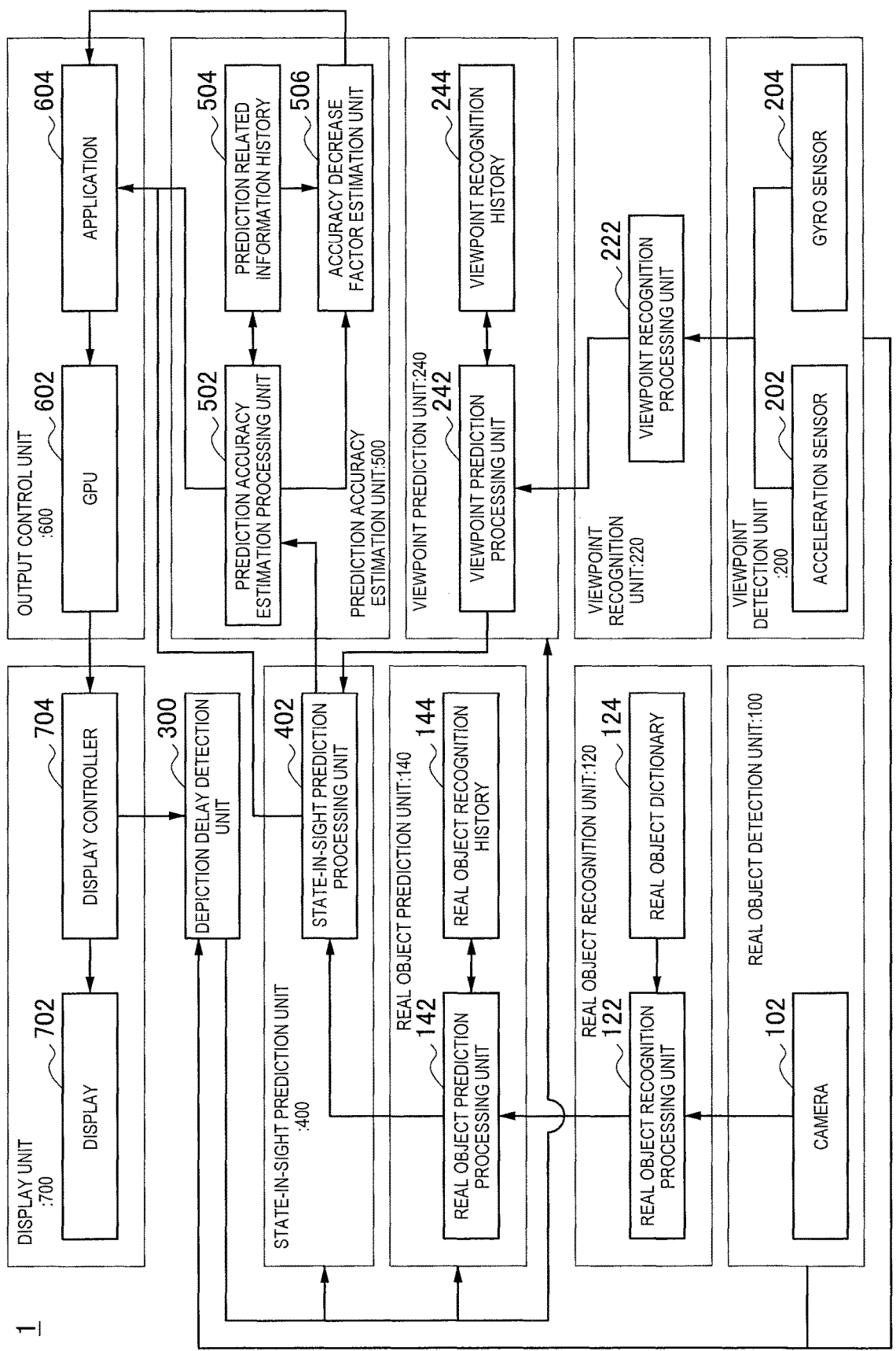
FIG. 23 is a block diagram illustrating an example of a logical configuration of an HMD according to the embodiment.

FIG. 23 is a block diagram illustrating an example of a logical configuration of an HMD 1 according to the embodiment. As illustrated in FIG. 23, the HMD 1 according to the embodiment has further detailed components in addition to the basis of the configuration of the information processing apparatus 1 described above with reference to FIG. 5. Hereinafter, the respective components will be described in detail.

The real object detection unit 100 includes a camera 102. The camera 102 is a device that captures a real space image. The camera 102 is installed to capture a field of vision (front) of the user when the user wears the HMD 1. The camera 102 provides a captured image and a time stamp of an imaging time to a real object recognition processing unit 122.

The real object recognition unit 120 includes the real object recognition processing unit 122 and a real object dictionary 124. The real object recognition processing unit 122 compares information of the real space that has been acquired by the camera 102 with features of the real object that have been registered in the real object dictionary 124 and discovers and recognizes the real object as a target of superimposition. The real object recognition processing unit 122 provides the position or the posture of the recognized real object and the time stamp that has been applied to the information used for the recognition to a real object prediction processing unit 142. The real object dictionary 124 is data that records the features of the real object as a target of superimposition. For example, the real object dictionary 124 can include information of feature points that are obtained when the real object is imaged by the camera 102.

The real object prediction unit 140 includes the real object prediction processing unit 142 and a real object recognition history 144. The real object prediction processing unit 142 refers to the position or the posture of the real object that has been recognized by the real object recognition processing unit 122 and the real object recognition history 144 and estimates movement or a change in the posture of the real object. The real object prediction processing unit 142 estimates the position or the posture of the real object at the display time $T_2$ on the basis of the estimation result. The real object prediction processing unit 142 performs prediction on the assumption that the time indicated by the time stamp that has been provided from the real object recognition processing unit 122 is $T_0$ and a time obtained by adding a delay $\Delta T$ that has been output from the depiction delay detection unit 300 to $T_0$ is $T_2$. For example, the real object prediction processing unit 142 performs prediction on the assumption that the real object moves linearly at a constant velocity from $T_0$ to $T_2$. The real object prediction processing unit 142 provides the predicted position or posture of the real object and a time stamp at the time $T_0$ that has been utilized for the prediction to a state-in-sight prediction processing unit 402. The real object recognition history 144 is a history of the recognition results of the position or the posture of the real object, which have been provided from the real object recognition processing unit 122 a plurality of times in the past, and time stamps that accompany them.

The viewpoint detection unit 200 includes an acceleration sensor 202 and a gyro sensor 204. The acceleration sensor 202 is a sensor that acquires acceleration applied to the HMD 1 for detecting movement of the viewpoint. The acceleration sensor 202 provides the acquired acceleration and a time stamp at the acquisition time to a viewpoint recognition processing unit 222. The gyro sensor 204 is a sensor that acquires an angular velocity of the HMD 1. The gyro sensor 204 provides the acquired angular velocity and a time stamp at the acquisition time to the viewpoint recognition processing unit 222.

The viewpoint recognition unit 220 includes the viewpoint recognition processing unit 222. The viewpoint recognition processing unit 222 recognizes the position or the posture of the viewpoint of the user on the basis of the acceleration and the angular velocity acquired by the acceleration sensor 202 and the gyro sensor 204. The viewpoint recognition processing unit 222 provides the recognition result and the time stamp that has been applied to the sensor information used for the recognition to a viewpoint prediction processing unit 242.

The viewpoint prediction unit 240 includes the viewpoint prediction processing unit 242 and a viewpoint recognition history 244. The viewpoint prediction processing unit 242 refers to the recognition result of the viewpoint recognition processing unit 222 and the viewpoint recognition history 244 and estimates a change in the position or the posture (direction) of the viewpoint. The viewpoint prediction processing unit 242 estimates the position or the posture of the viewpoint at the time $T_2$ on the basis of the estimation result. The viewpoint prediction processing unit 242 performs prediction on the assumption that the time indicated by the time stamp that has been provided from the viewpoint recognition processing unit 222 is $T_0$ and the time obtained by adding a delay $\Delta T$ that has been output from the depiction delay detection unit 300 to $T_0$ is $T_2$. For example, the viewpoint prediction processing unit 242 performs prediction on the assumption that the viewpoint moves linearly at a constant velocity from $T_0$ to $T_2$. The viewpoint prediction processing unit 242 provides the predicted position or posture of the viewpoint and the time stamp at the time $T_0$ that has been utilized for the prediction to the state-in-sight prediction processing unit 402. The viewpoint recognition history 244 is a history of the recognition results of the position or the posture of the viewpoint, which have been provided from the viewpoint recognition processing unit 222 a plurality of times in the past, and the time stamps that accompany them.

The depiction delay detection unit 300 detects how long the display time $T_2$ is delayed with respect to the detection time $T_0$. The depiction delay detection unit 300 compares a time stamp at a timing at which each of the real object detection unit 100 and the viewpoint detection unit 200 acquires information of the real space with a time stamp at a timing at which a display controller 704 outputs an image on the basis of the acquired information and detects the difference therebetween as a delay ($\Delta T$). The depiction delay detection unit 300 provides the detected delay to each of the real object prediction unit 140, the viewpoint prediction unit 240, and the state-in-sight prediction unit 400.

The state-in-sight prediction unit 400 includes the state-in-sight prediction processing unit 402. The state-in-sight prediction processing unit 402 predicts a state in the field of vision on the basis of the position or the posture of the real object after movement that has been predicted by the real object prediction processing unit 142 and the position or the posture of the viewpoint after movement that has been predicted by the viewpoint prediction processing unit 242. Specifically, the state-in-sight prediction processing unit 402 predicts at which position and posture the real object as a target of superimposition with the virtual object is present in the field of vision at the timing (display time $T_2$) at which the display controller 704 outputs the image.

The prediction accuracy estimation unit 500 includes a prediction accuracy estimation processing unit 502, a prediction related information history 504, and an accuracy decrease factor estimation unit 506. The prediction accuracy estimation processing unit 502 provides information indicating a degree of accuracy of prediction that has been performed by the state-in-sight prediction processing unit 402 to an application 604. The prediction related information history 504 is a log of information that has been used by the prediction accuracy estimation processing unit 502 for the estimation. For example, the prediction related information history 504 can include the prediction result of the state-in-sight prediction processing unit 402, the position or the posture of the real object or the viewpoint that has been utilized for the prediction and the time stamp that accompanies it, and the delay $\Delta T$ that has been output by the depiction delay detection unit 300. The accuracy decrease factor estimation unit 506 estimates a factor of a decrease of the degree of prediction accuracy and provides information indicating the estimation result to the application 604 in a case in which the prediction accuracy estimation processing unit 502 has determined that the degree of prediction accuracy is low. For example, the accuracy decrease factor estimation unit 506 refers to the prediction related information history 504 and estimates a factor of the low degree of prediction accuracy, such as irregular movement of the real object or movement of the viewpoint caused by large movement of the user's head.

The output control unit 600 includes a GPU 602 and the application 604. The GPU 602 is a processing device that executes various kinds of computation related to image processing. The GPU 602 performs depiction on the basis of an instruction from the application 604 and provides the depiction result to the display controller 704. The application 604 is software that provides main functions that are used by the user. The application 604 provides a UI that superimposedly displays the virtual object on the real object in the real space, as one of the functions. The application 604 performs the depiction by deciding where and what kind of virtual object is to be depicted with what kind of expression when the virtual object is displayed and issuing a depiction command to the GPU 602. The application 604 causes a change in display contents of the virtual object in accordance with the prediction result of the prediction accuracy estimation processing unit 502 and the estimation result of the accuracy decrease factor estimation unit 506.

The display unit 700 includes a display 702 and the display controller 704. The display 702 is a device that receives an output signal from the display controller 704 and displays video. The display controller 704 is a device that receives the depiction result of the GPU 602 and outputs a video signal to the display 702. The display controller 704 outputs information indicating a time of an output timing as a time stamp and provides the information to the depiction delay detection unit 300 when the signal is output.

The configuration example of the HMD 1 was described hitherto. However, the HMD 1 can employ a configuration other than the configuration example as described above according to the present technology. Hereinafter, one example thereof will be described.

3.2 Configuration Example 2

Figure 24:
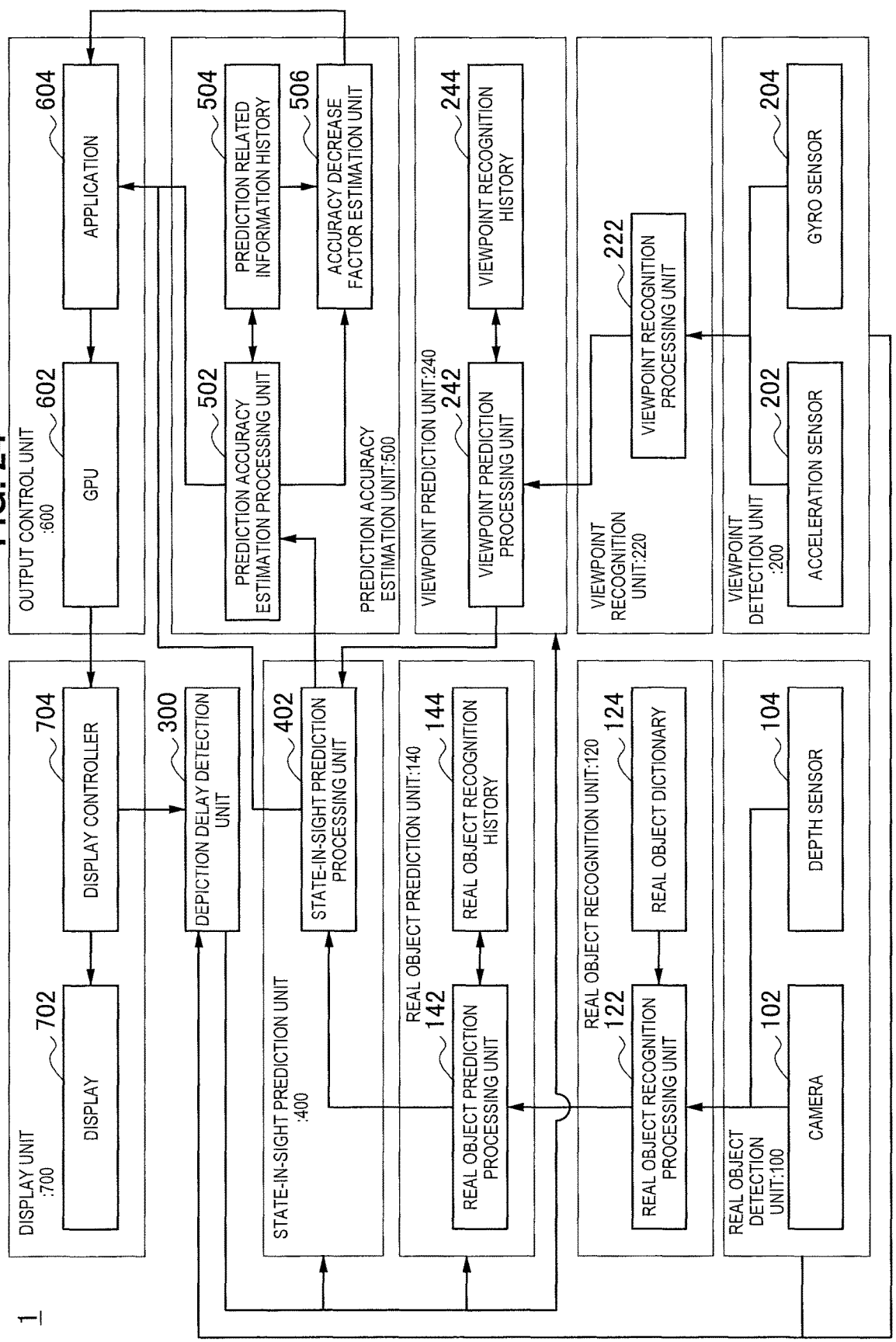
FIG. 24 is a block diagram illustrating an example of a logical configuration of an HMD according to the embodiment.

FIG. 24 is a block diagram illustrating an example of a logical configuration of the HMD 1 according to the embodiment. As illustrated in FIG. 24, the HMD 1 according to the configuration example is different from the configuration example illustrated in FIG. 23 in relation to the real object detection unit 100. Hereinafter, different points will be described.

The real object detection unit 100 includes the camera 102 and a depth sensor 104. The depth sensor 104 is a sensor that acquires depth information. The depth sensor 104 is installed to acquire depth information in the same direction as that of the camera 102. The depth sensor 104 provides the acquired depth information and a time stamp at the acquisition time to the real object recognition processing unit 122. Alternatively, the functions of the camera 102 and the depth sensor 104 may be realized as a stereo camera.

The real object recognition processing unit 122 compares information of the real space acquired by the camera 102 and the depth sensor 104 and features of the real object, which have been registered in the real object dictionary 124, and discovers and recognizes the real object as a target of superimposition. In addition, the real object dictionary 124 can include information of feature points that have been obtained when the real object is imaged by the camera 102 and information related to a stereoscopic shape of the real object.

3.3 Configuration Example 3

Figure 25:
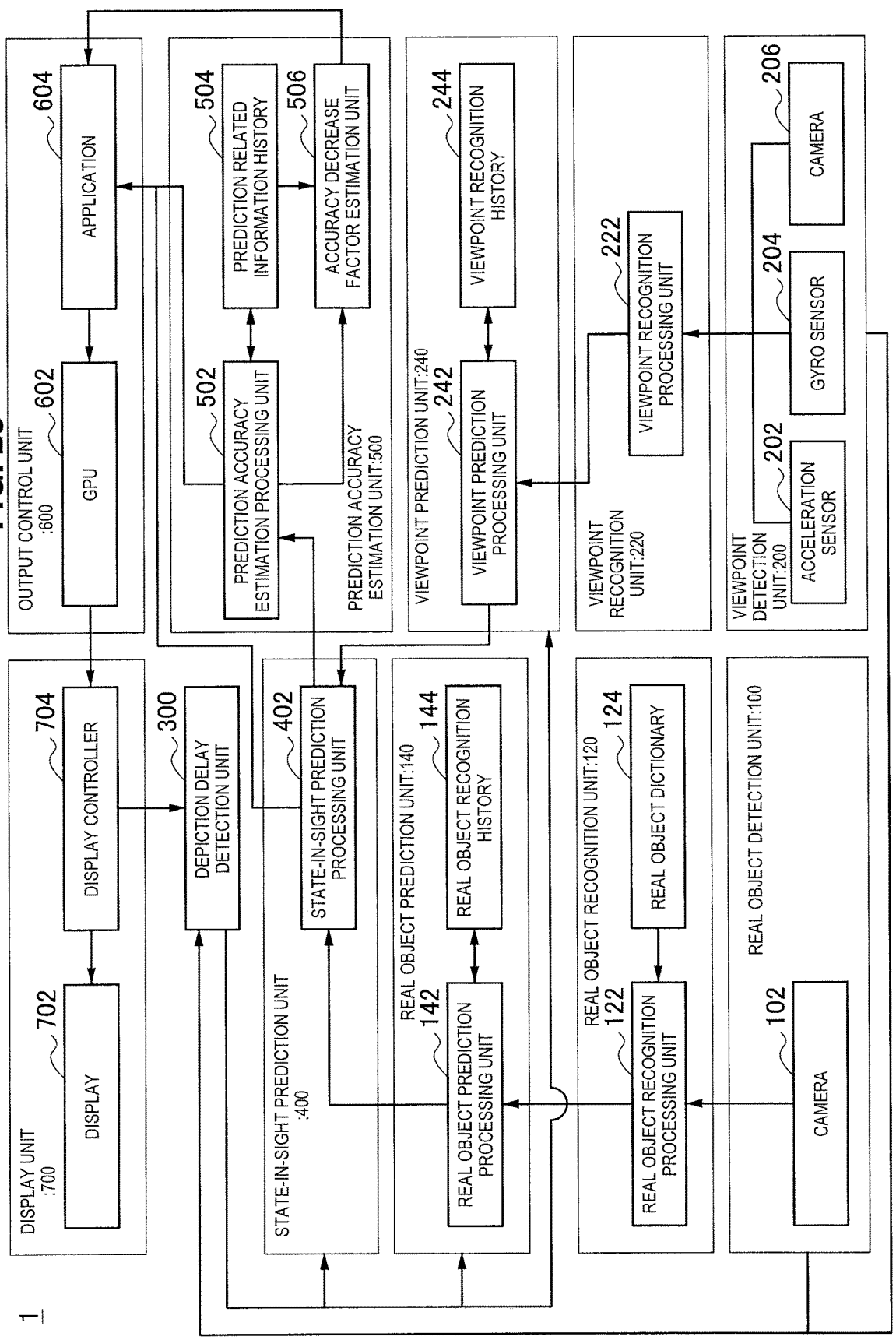
FIG. 25 is a block diagram illustrating an example of a logical configuration of an HMD according to the embodiment.

FIG. 25 is a block diagram illustrating an example of a logical configuration of the HMD 1 according to the embodiment. As illustrated in FIG. 25, the HMD 1 according to the configuration example is different from the configuration example illustrated in FIG. 23 in relation to the viewpoint detection unit 200. Hereinafter, different points will be described.

The viewpoint detection unit 200 includes the acceleration sensor 202, the gyro sensor 204, and a camera 206. The camera 206 is installed such that both eyes of the user correspond to an imaging range. The camera 206 provides an acquired captured image and a time stamp at the acquisition time to the viewpoint recognition processing unit 222.

The viewpoint recognition processing unit 222 recognizes the position or the posture of the viewpoint of the user on the basis of the acceleration, the angular velocity, and the captured image that have been acquired by the acceleration sensor 202, the gyro sensor 204, and the camera 206.

4. MODIFICATION EXAMPLE

Subsequently, a modification example of the information processing apparatus 1 according to the embodiment will be described. The information processing apparatus 1 according to the modification example adjusts the length of the time lag in accordance with the degree of prediction accuracy.

Figure 26:
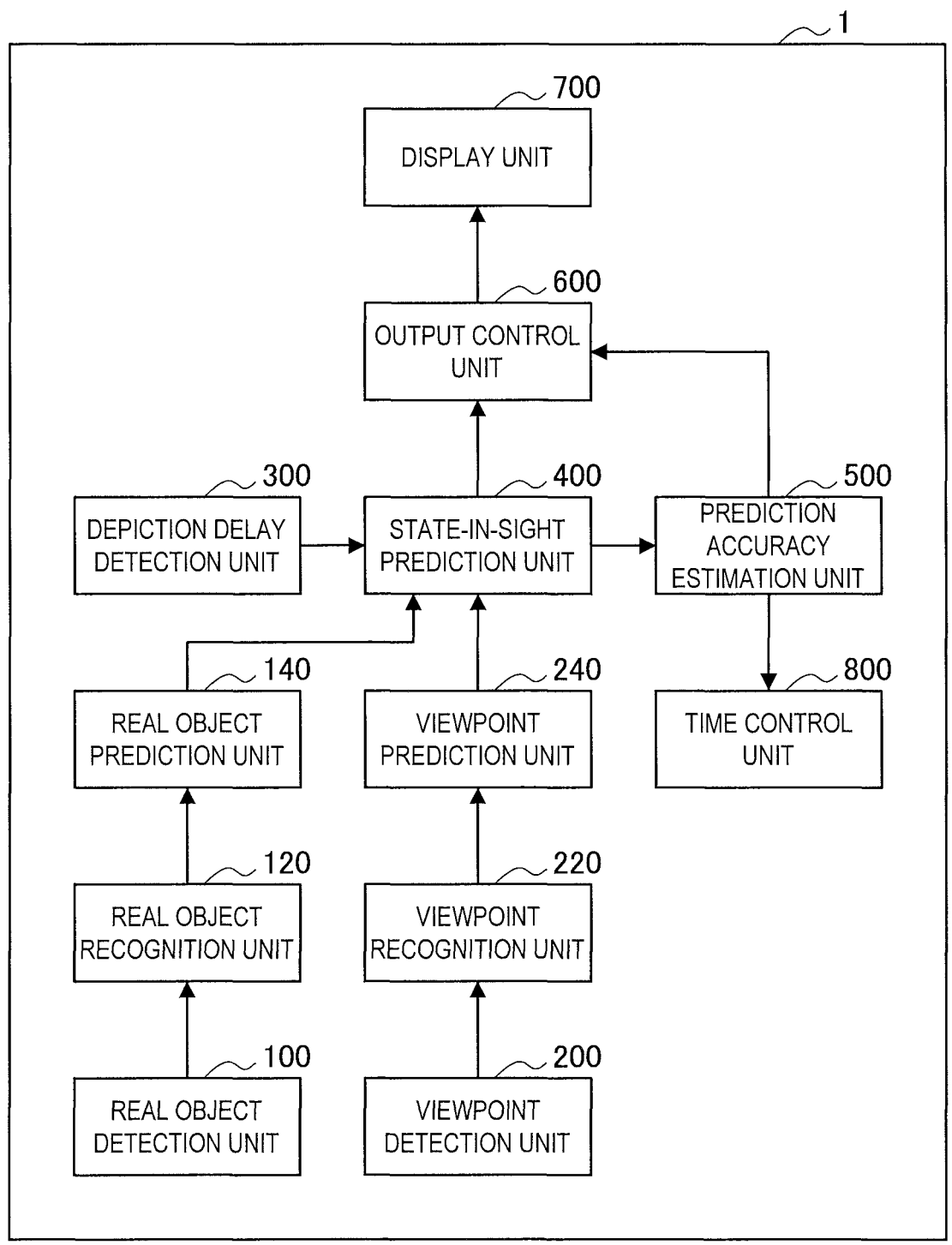
FIG. 26 is a block diagram illustrating an example of a logical configuration of an information processing apparatus according to a modification example.

FIG. 26 is a block diagram illustrating an example of a logical configuration of the information processing apparatus 1 according to the modification example. As illustrated in FIG. 26, the information processing apparatus 1 according to the modification example includes a time control unit 800 in addition to the components illustrated in FIG. 5.

The time control unit 800 has a function of controlling the length of the time lag in accordance with the degree of prediction accuracy. As described above, an improvement in the degree of prediction accuracy is expected if the time lag is short. Therefore, the time control unit 800 sets the time lag to be short in a case in which the degree of prediction accuracy is insufficient and sets the time lag to be long in a case in which the degree of prediction accuracy is excessive. In this manner, the time control unit 800 can maintain a desirable degree of prediction accuracy. Also, the time control unit 800 can control the length of the time lag by raising or lowering the operation velocity of the CPU, the GPU, the sensor, or the like, for example. It is a matter of course that the time control unit 800 may control the length of the time lag without changing the operation velocity.

Here, power consumption can increase if the operation velocity is raised. Therefore, the time control unit 800 may control the length of the time lag by controlling the power consumption of the information processing apparatus 1 from another viewpoint regarding the control of the length of the time lag. For example, the time control unit 800 controls the power consumption within a range in which the degree of prediction accuracy estimated by the prediction accuracy estimation unit 500 exceeds a threshold value. Specifically, the time control unit 800 raises the power consumption and sets a high operation velocity in a case in which the degree of prediction accuracy is less than the threshold value and lowers the power consumption and sets a low operation velocity in a case in which the degree of prediction accuracy exceeds the threshold value. In this manner, it is possible to maintain the degree of prediction accuracy while preventing the power consumption from unnecessarily increasing.

Also, the information processing apparatus 1 (the output control unit 600, for example) may place a greater priority on processing related to the virtual object to be displayed in a region to which the user pays attention or the virtual object to which the user pays attention, for example, than on others, as one of technologies for reducing the power consumption. For example, the information processing apparatus 1 may lower a processing velocity (a frame rate or the like) of processing related to other virtual objects. In this manner, power saving is realized within a range in which usability is not degraded.

In addition, the information processing apparatus 1 may have an ordinary mode and a power saving mode as operation modes. Specifically the information processing apparatus 1 raises the power consumption and sets a high operation velocity in the ordinary mode. In addition, the information processing apparatus 1 lowers the power consumption and sets a low operation velocity in the power saving mode. For example, the information processing apparatus 1 may automatically shift operations between an operation performed in the ordinary mode indoors because of easiness in charging and an operation performed in the power saving mode outdoors.

5. HARDWARE CONFIGURATION EXAMPLE

Figure 27:
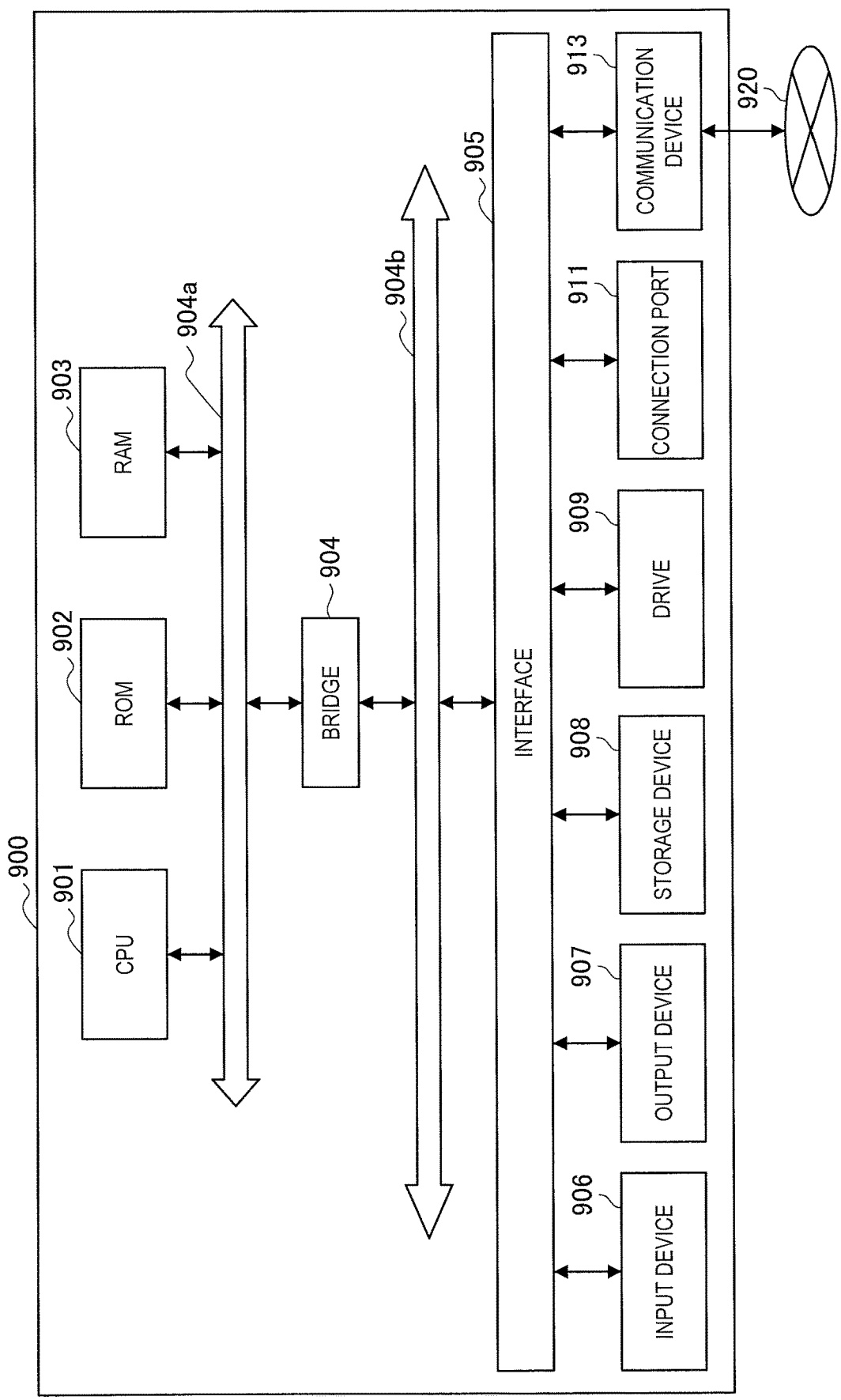
FIG. 27 is a block diagram illustrating an example of a hardware configuration of the information processing apparatus according to the embodiment.

Finally, a hardware configuration of an information processing apparatus according to the present embodiment will be described with reference to FIG. 27. FIG. 27 is a block diagram illustrating an example of the hardware configuration of the information processing apparatus according to the present embodiment. Meanwhile, the information processing apparatus 900 illustrated in FIG. 27 may realize the information processing apparatus 1 illustrated in each of FIGS. 5, 23 to 26, for example. Information processing by the information processing apparatus 1 according to the present embodiment is realized according to cooperation between software and hardware described below.

As illustrated in FIG. 27, the information processing apparatus 900 includes a central processing unit (CPU) 901, a read only memory (ROM) 902, a random access memory (RAM) 903 and a host bus 904a. In addition, the information processing apparatus 900 includes a bridge 904, an external bus 904b, an interface 905, an input device 906, an output device 907, a storage device 908, a drive 909, a connection port 911 and a communication device 913. The information processing apparatus 900 may include a processing circuit such as a DSP or an ASIC instead of the CPU 901 or along therewith.

The CPU 901 functions as an arithmetic processing device and a control device and controls the overall operation in the information processing apparatus 900 according to various programs. Further, the CPU 901 may be a microprocessor. The ROM 902 stores programs, operation parameters and the like used by the CPU 901. The RAM 903 temporarily stores programs used in execution of the CPU 901, parameters appropriately changed in the execution, and the like. The CPU 901 can form the real object recognition unit 120, the real object prediction unit 140, the viewpoint recognition unit 220, the viewpoint prediction unit 240, the depiction delay detection unit 300, the state-in-sight prediction unit 400, the prediction accuracy estimation unit 500, and the output control unit 600 that are illustrated in FIG. 5 and FIGS. 23 to 26, for example. Also, the CPU 901 can form the time control unit 800 illustrated in FIG. 26, for example.

The CPU 901, the ROM 902 and the RAM 903 are connected by the host bus 904a including a CPU bus and the like. The host bus 904a is connected with the external bus 904b such as a peripheral component interconnect/interface (PCI) bus via the bridge 904. Further, the host bus 904a, the bridge 904 and the external bus 904b are not necessarily separately configured and such functions may be mounted in a single bus.

The input device 906 is realized by a device through which a user inputs information, such as a mouse, a keyboard, a touch panel, a button, a microphone, a switch, and a lever. In addition, the input device 906 may be a remote control device using infrared ray or other electric waves or external connection equipment such as a cellular phone or a PDA corresponding to operation of the information processing apparatus 900, for example. Furthermore, the input device 906 may include an input control circuit or the like which generates an input signal on the basis of information input by the user using the aforementioned input means and outputs the input signal to the CPU 901, for example. The user of the information processing apparatus 900 may input various types of data or order a processing operation for the information processing apparatus 900 by operating the input device 906.

In addition to the above, the input device 906 can be formed by a device that detects information related to the user. For example, the input device 906 can include various sensors such as an image sensor (a camera, for example), a depth sensor (a stereo camera, for example), an acceleration sensor, a gyro sensor, a geomagnetic sensor, an optical sensor, a sound sensor, a distance measurement sensor, and a force sensor. Also, the input device 906 may acquire information related to the state of the information processing apparatus 900 itself such as the posture and the moving velocity of the information processing apparatus 900 and information related to a surrounding environment of the information processing apparatus 900 such as brightness or noise around the information processing apparatus 900. Also, the input device 906 may include a GNSS module that receives a GNSS signal (a GPS signal from a global positioning system (GPS) satellite, for example) from a global navigation satellite system (GNSS) satellite and measures position information including the latitude, the longitude, and the altitude of the device. In addition, the input device 906 may detect the position through Wi-Fi (registered trademark), transmission and reception to and from a mobile phone, a PHS, a smartphone, or the like, near-field communication, or the like, in relation to the position information. The input device 906 can form the real object detection unit 100 and the viewpoint detection unit 200 that are illustrated in FIG. 5 and FIGS. 23 to 26, for example.

The output device 907 is formed by a device that may visually or aurally notify the user of acquired information. As such devices, there is a display device such as a CRT display device, a liquid crystal display device, a plasma display device, an EL display device, a laser projector, an LED projector or a lamp, a sound output device such as a speaker and a headphone, a printer device and the like. The output device 907 outputs results acquired through various processes performed by the information processing apparatus 900, for example. Specifically, the display device visually displays results acquired through various processes performed by the information processing apparatus 900 in various forms such as text, images, tables and graphs. On the other hand, the sound output device converts audio signals including reproduced sound data, audio data and the like into analog signals and aurally outputs the analog signals. The aforementioned display device may form the display unit 700 illustrated in each of FIGS. 5, 23 to 26, for example.

The storage device 908 is a device for data storage, formed as an example of a storage unit of the information processing apparatus 900. For example, the storage device 908 is realized by a magnetic storage device such as an HDD, a semiconductor storage device, an optical storage device, a magneto-optical storage device or the like. The storage device 908 may include a storage medium, a recording device for recording data on the storage medium, a reading device for reading data from the storage medium, a deletion device for deleting data recorded on the storage medium and the like. The storage device 908 stores programs and various types of data executed by the CPU 901, various types of data acquired from the outside and the like.

The drive 909 is a reader/writer for storage media and is included in or externally attached to the information processing apparatus 900. The drive 909 reads information recorded on a removable storage medium such as a magnetic disc, an optical disc, a magneto-optical disc or a semiconductor memory mounted thereon and outputs the information to the RAM 903. In addition, the drive 909 can write information on the removable storage medium.

The connection port 911 is an interface connected with external equipment and is a connector to the external equipment through which data may be transmitted through a universal serial bus (USB) and the like, for example.

The communication device 913 is a communication interface formed by a communication device for connection to a network 920 or the like, for example. The communication device 913 is a communication card or the like for a wired or wireless local area network (LAN), long term evolution (LTE), Bluetooth (registered trademark) or wireless USB (WUSB), for example. In addition, the communication device 913 may be a router for optical communication, a router for asymmetric digital subscriber line (ADSL), various communication modems or the like. For example, the communication device 913 may transmit/receive signals and the like to/from the Internet and other communication apparatuses according to a predetermined protocol, for example, TCP/IP or the like.

Further, the network 920 is a wired or wireless transmission path of information transmitted from devices connected to the network 920. For example, the network 920 may include a public circuit network such as the Internet, a telephone circuit network or a satellite communication network, various local area networks (LANs) including Ethernet (registered trademark), a wide area network (WAN) and the like. In addition, the network 920 may include a dedicated circuit network such as an internet protocol-virtual private network (IP-VPN).

Hereinbefore, an example of a hardware configuration capable of realizing the functions of the information processing apparatus 900 according to this embodiment is shown. The respective components may be implemented using universal members, or may be implemented by hardware specific to the functions of the respective components. Accordingly, according to a technical level at the time when the embodiments are executed, it is possible to appropriately change hardware configurations to be used.

In addition, a computer program for realizing each of the functions of the information processing apparatus 900 according to the present embodiment as described above may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. Further, the computer program may be delivered through a network, for example, without using the recording medium.

6. CONCLUSION

The embodiment of the present disclosure was described in detail hitherto with reference to FIGS. 1 to 27. As described above, the information processing apparatus 1 estimates the degree of prediction accuracy related to the prediction of the position or the posture of the real object that appears in the display unit 700 and displays the virtual object corresponding to the real object on the basis of the estimation result. Disturbance of the display is less likely to occur as the degree of prediction accuracy is higher, and the disturbance of the display more easily occurs as the degree of prediction accuracy is lower. Therefore, the information processing apparatus 1 can suppress the disturbance of the display of the virtual object and further reduce an unpleasant feeling caused by the disturbance of the display by performing display in consideration of the degree of prediction accuracy.

In addition, the information processing apparatus 1 makes the display of the virtual object clearer as the degree of prediction accuracy is higher and makes the display of the virtual object more ambiguous as the degree of prediction accuracy is lower. In this manner, even in a case in which it is expected that deviation occurs in the display of the virtual object, it is possible to reduce the influence thereof with ambiguous display and to reduce confusion or an unpleasant feeling of the user.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, although the position and the posture were described as alternatives in the aforementioned embodiment on the assumption that the information processing apparatus 1 controlled the position or the posture of the virtual object, the present technology is not limited to such an example. The information processing apparatus 1 may control both the position and the posture. In such a case, "or" described in the above description in relation to the positions and the postures of the real object and the virtual object may be replaced with "and".

Note that it is not necessary for the processing described in this specification with reference to the flowchart and the sequence diagram to be executed in the order shown in the flowchart. Some processing steps may be performed in parallel. Further, some of additional steps can be adopted, or some processing steps can be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

(1)

An information processing apparatus including:

a prediction accuracy estimation unit that estimates a degree of prediction accuracy related to prediction of a position or a posture of a real object; and an output control unit that outputs information for causing a display unit to display a virtual object corresponding to the real object on a basis of an estimation result of the prediction accuracy estimation unit.

(2)

The information processing apparatus according to (1), in which the output control unit outputs information for allowing display of the virtual object such that relevance with the corresponding real object is higher as the degree of prediction accuracy is higher and allowing display of the virtual object such that the relevance with the corresponding real object is lower as the degree of prediction accuracy is lower.

(3)

The information processing apparatus according to (1) or (2), in which the output control unit outputs information for allowing display of the virtual object in a more blurred manner as the degree of prediction accuracy is lower.

(4)

The information processing apparatus according to (3), in which the output control unit outputs information for allowing display of the virtual object to which motion blur has been added.

(5)

The information processing apparatus according to (3), in which the output control unit outputs information for allowing display of the virtual object with a lighter tone at a further outward edge.

(6)

The information processing apparatus according to any one of (2) to (5), in which the output control unit allows a change in a size of the virtual object in accordance with the degree of prediction accuracy.

(7)

The information processing apparatus according to any one of (2) to (6), in which the output control unit allows a change in a depiction effect to be applied to the virtual object in accordance with the degree of prediction accuracy.

(8)

The information processing apparatus according to any one of (1) to (7), in which the output control unit outputs information for allowing display of the virtual object in accordance with a factor of the low degree of prediction accuracy.

(9)

The information processing apparatus according to (8), in which the output control unit outputs information for not allowing display of the virtual object in a case in which the factor arises from motion of a viewpoint.

(10)

The information processing apparatus according to (8), in which the output control unit outputs information for allowing display of the virtual object to which motion blur has been added in a case in which the factor arises from motion of the real object.

(11)

The information processing apparatus according to any one of (1) to (10), in which the prediction accuracy estimation unit estimates the degree of prediction accuracy on a basis of at least one of magnitude or regularity of motion of a target that is used for prediction of the position or the posture.

(12)

The information processing apparatus according to (11), in which the target is the real object.

(13)

The information processing apparatus according to (11) or (12), in which the target is the display unit.

(14)

The information processing apparatus according to any one of (11) to (13), in which the target is a user's eye.

(15)

The information processing apparatus according to any one of (1) to (14), in which the prediction of the position or the posture is prediction related to a time from a timing at which information for the prediction is detected to a timing at which the virtual object is displayed.

(16)

The information processing apparatus according to (15), further including:

a time control unit that controls a length of the time in accordance with the degree of prediction accuracy.

(17)

The information processing apparatus according to (16), in which the time control unit controls the length of the time by controlling power consumption of the information processing apparatus.

(18)

The information processing apparatus according to any one of (15) to (17), in which the prediction accuracy estimation unit estimates that the degree of prediction accuracy is lower as the time is longer and that the degree of prediction accuracy is higher as the time is shorter.

(19)

The information processing apparatus according to any one of (1) to (18), in which the output control unit outputs information for allowing display of the virtual object at a position corresponding to the predicted position of the real object or at a posture corresponding to the predicted posture of the real object.

(20)

The information processing apparatus according to any one of (1) to (19), in which the display unit is a transmissive type display device that displays the virtual object while transmitting the real object in a real space.

(21)

The information processing apparatus according to any one of (1) to (19), in which the display unit is a non-transmissive type display device that further displays the virtual object while displaying the imaged real object in real time.

(22)

An information processing method including:

estimating, by a processor, a degree of prediction accuracy related to prediction of a position or a posture of a real object; and outputting information for causing a display unit to display a virtual object corresponding to the real object on a basis of an estimation result of the degree of prediction accuracy.

(23)

A program that causes a computer to function as:

a prediction accuracy estimation unit that estimates a degree of prediction accuracy related to prediction of a position or a posture of a real object; and an output control unit that outputs information for causing a display unit to display a virtual object corresponding to the real object on a basis of an estimation result of the prediction accuracy estimation unit.

REFERENCE SIGNS LIST 1 information processing apparatus
100 real object detection unit
120 real object recognition unit
140 real object prediction unit
200 viewpoint detection unit
220 viewpoint recognition unit
240 viewpoint prediction unit
300 depiction delay detection unit
400 state-in-sight prediction unit
500 prediction accuracy estimation unit
600 output control unit
700 display unit
800 time control unit

The invention claimed is:

1. An information processing apparatus comprising:
a prediction accuracy estimation unit configured to estimate a degree of prediction accuracy related to prediction of a position or a posture of a real object, wherein the prediction accuracy estimation unit estimates the degree of prediction accuracy based on a regularity of motion of a target that is used for the prediction of the position or the posture of the real object; and
an output control unit configured to output information for causing a display unit to display a virtual object corresponding to the real object on a basis of an estimation result of the prediction accuracy estimation unit,
wherein the output control unit outputs the information for causing the display unit to display the virtual object based on a type of the target that is used for the prediction,
wherein when the type of the target that is used for the prediction is a viewpoint from which the real object is viewed, the output control unit outputs the information for causing the display unit not to display the virtual object,
wherein when the type of the target that is used for the prediction is the real object, the output control unit outputs the information for causing the display unit to display the virtual object with motion blur processing applied, and
wherein the prediction accuracy estimation unit and the output control unit are each implemented via at least one processor.

2. The information processing apparatus according to claim 1,
wherein the output control unit outputs information for allowing display of the virtual object such that relevance with the corresponding real object is higher as the degree of prediction accuracy is higher and allowing display of the virtual object such that the relevance with the corresponding real object is lower as the degree of prediction accuracy is lower.

3. The information processing apparatus according to claim 1,
wherein the output control unit outputs information for allowing display of the virtual object in a more blurred manner as the degree of prediction accuracy is lower.

4. The information processing apparatus according to claim 3,
wherein the output control unit outputs information for allowing display of the virtual object to which motion blur has been added.

5. The information processing apparatus according to claim 3,
wherein the output control unit outputs information for allowing display of the virtual object with a lighter tone at a further outward edge.

6. The information processing apparatus according to claim 2,
wherein the output control unit allows a change in a size of the virtual object in accordance with the degree of prediction accuracy.

7. The information processing apparatus according to claim 2,
wherein the output control unit allows a change in a depiction effect to be applied to the virtual object in accordance with the degree of prediction accuracy.

8. The information processing apparatus according to claim 1,
wherein the output control unit outputs information for allowing display of the virtual object in accordance with a factor of the low degree of prediction accuracy.

9. The information processing apparatus according to claim 8,
wherein the output control unit outputs information for not allowing display of the virtual object in a case in which the factor arises from motion of a viewpoint.

10. The information processing apparatus according to claim 8,
wherein the output control unit outputs information for allowing display of the virtual object to which motion blur has been added in a case in which the factor arises from motion of the real object.

11. The information processing apparatus according to claim 1,
wherein the prediction accuracy estimation unit further estimates the degree of prediction accuracy based on a magnitude of the motion of the target that is used for the prediction of the position or the posture of the real object.

12. The information processing apparatus according to claim 1,
wherein the target is the real object.

13. The information processing apparatus according to claim 1,
wherein the target is the display unit.

14. The information processing apparatus according to claim 1,
wherein the target is a user's eye.

15. The information processing apparatus according to claim 1,
wherein the prediction of the position or the posture is prediction related to a time from a timing at which information for the prediction is detected to a timing at which the virtual object is displayed.

16. The information processing apparatus according to claim 15, further comprising:
a time control unit configured to control a length of the time in accordance with the degree of prediction accuracy,
wherein the time control unit is implemented via at least one processor.

17. The information processing apparatus according to claim 15,
wherein the prediction accuracy estimation unit estimates that the degree of prediction accuracy is lower as the time is longer and that the degree of prediction accuracy is higher as the time is shorter.

18. The information processing apparatus according to claim 1,
wherein the output control unit outputs information for allowing display of the virtual object at a position corresponding to the predicted position of the real object or at a posture corresponding to the predicted posture of the real object.

19. An information processing method comprising:

estimating, by a processor, a degree of prediction accuracy related to prediction of a position or a posture of a real object; and outputting information for causing a display unit to display a virtual object corresponding to the real object on a basis of an estimation result of the degree of prediction accuracy, wherein estimating the degree of prediction accuracy is based on a regularity of motion of a target that is used for the prediction of the position or the posture of the real object, wherein the information for causing the display unit to display the virtual object is output based on a type of the target that is used for the prediction, wherein when the type of the target that is used for the prediction is a viewpoint from which the real object is viewed, the information causes the display unit not to display the virtual object, and wherein when the type of the target that is used for the prediction is the real object, the information causes the display unit to display the virtual object with motion blur processing applied.

20. A non-transitory computer-readable medium having embodied thereon a program, which when executed by a computer causes the computer to execute a method, the method comprising:

estimating a degree of prediction accuracy related to prediction of a position or a posture of a real object, wherein estimating the degree of prediction accuracy is based on a regularity of motion of a target that is used for the prediction of the position or the posture of the real object; and outputting information for causing a display unit to display a virtual object corresponding to the real object on a basis of an estimation result of the degree of prediction accuracy, wherein the information for causing the display unit to display the virtual object is output based on a type of the target that is used for the prediction, wherein when the type of the target that is used for the prediction is a viewpoint from which the real object is viewed, the information causes the display unit not to display the virtual object, and wherein when the type of the target that is used for the prediction is the real object, the information causes the display unit to display the virtual object with motion blur processing applied.

* * * * *